United States Patent
Yamada et al.

(10) Patent No.: US 8,830,516 B2
(45) Date of Patent: Sep. 9, 2014

(54) POWER SUPPLY CONTROL DEVICE, POWER SUPPLY CONTROL SYSTEM, POWER SUPPLY CONTROL METHOD, AND NON-TRANSITORY COMPUTER-READABLE RECORDING MEDIUM ENCODED WITH POWER SUPPLY CONTROL PROGRAM

(71) Applicant: Konica Minolta, Inc., Chiyoda-ku (JP)

(72) Inventors: Masami Yamada, Sennan-gun (JP); Kenichi Takahashi, Sennan-gun (JP); Nobuhiro Mishima, Osaka (JP); Shuji Yoneda, Osaka (JP); Kaitaku Ozawa, Nishinomiya (JP); Yuki Asai, Itami (JP)

(73) Assignee: Konica Minolta, Inc., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/158,555

(22) Filed: Jan. 17, 2014

(65) Prior Publication Data
US 2014/0204409 A1     Jul. 24, 2014

(30) Foreign Application Priority Data
Jan. 21, 2013   (JP) ................... 2013-008369

(51) Int. Cl.
  *G06F 3/12*     (2006.01)
  *H04N 1/00*    (2006.01)
(52) U.S. Cl.
  CPC ....... *H04N 1/00891* (2013.01); *H04N 1/00896* (2013.01)
  USPC ........ 358/1.15; 358/1.13; 358/1.14; 358/1.16
(58) Field of Classification Search
  CPC .......... H04N 1/00885; H04N 1/00896; H04N 1/00904; G06F 21/64; G06F 21/78
  USPC ...................... 358/1.13, 1.1, 1.16, 1.14, 1.15; 307/125, 80, 81, 128
  See application file for complete search history.

(56) References Cited

U.S. PATENT DOCUMENTS

| | | | |
|---|---|---|---|
| 6,177,739 B1* | 1/2001 | Matsudaira et al. | 307/125 |
| 7,982,889 B2* | 7/2011 | Okada | 358/1.14 |
| 2005/0128515 A1* | 6/2005 | Ohno | 358/1.15 |
| 2007/0136293 A1* | 6/2007 | Mizumukai | 707/9 |
| 2007/0182998 A1* | 8/2007 | Okada | 358/400 |
| 2009/0310170 A1* | 12/2009 | Murakami et al. | 358/1.15 |
| 2010/0315682 A1* | 12/2010 | Nakamura et al. | 358/1.15 |

FOREIGN PATENT DOCUMENTS

JP        2010-199765 A    9/2010

* cited by examiner

*Primary Examiner* — Dennis Dicker
(74) *Attorney, Agent, or Firm* — Buchanan Ingersoll & Rooney PC

(57) ABSTRACT

A power supply control device includes a power conversion portion to convert AC power from a commercial power supply to DC, a control portion, a first communication portion connected to a network, a second communication portion connected to an image forming apparatus, and a device power supply switch arranged between the commercial power supply and the image forming apparatus. The control portion includes a mode decision portion to decide between a normal mode and a power-saving mode, a positional information acquisition portion to acquire positional information of the image forming apparatus, a sleep switch portion to open the device power supply switch, an activation portion to close the device power supply switch in response to a packet including the positional information of the image forming apparatus, a temporary storage control portion to temporarily store the packet, a packet transmission portion to transmit the packet, and a connection portion.

14 Claims, 13 Drawing Sheets

POWER SUPPLY CONTROL DEVICE, POWER SUPPLY CONTROL SYSTEM, POWER SUPPLY CONTROL METHOD, AND NON-TRANSITORY COMPUTER-READABLE RECORDING MEDIUM ENCODED WITH POWER SUPPLY CONTROL PROGRAM

This application is based on Japanese Patent Application No. 2013-008369 filed with Japan Patent Office on Jan. 21, 2013, the entire content of which is hereby incorporated by reference.

BACKGROUND OF THE INVENTION

1. Field of the Invention

The present invention relates to a power supply control device, a power supply control system, a power supply control method, and a non-transitory computer-readable recording medium encoded with a power supply control program. More specifically, the present invention relates to a power supply control device connected to electronic equipment driven by a commercial power supply, a power supply control system including a plurality of power supply control devices connected to a plurality of electronic equipment, a power supply control method executed in the power supply control device, and a non-transitory computer-readable recording medium encoded with a power supply control program for causing a computer to execute the power supply control method.

2. Description of the Related Art

Electronic equipment such as Multi-Functional Peripherals (hereinafter referred to as "MFPs") is required to reduce power consumption in a standby state when not being in operation. MFPs are often driven by electric power fed from a commercial power supply. Therefore, some of recent MFPs have a function of reducing power consumption in a standby state.

On the other hand, MFPs have a communication circuit for communicating with external devices and need to activate the communication circuit in order to externally receive data, which consumes power in the communication circuit even in a standby state.

As a technique for solving this problem, for example, Japanese Patent Laid-Open No. 2010-199765 discloses a data transfer system including host equipment and client equipment connected via a LAN through an intelligent hub. The data transfer system includes holding means for holding data output from the host equipment, first output means for outputting a confirmation signal for confirming that power is on to the client equipment when the data from the host equipment is held in the holding means, second output means for outputting a proxy response signal for the client equipment to the host equipment, and control means for outputting the data held in the holding means to the client equipment if a response signal indicating power-on is input from the client equipment.

However, some existing MFPs do not have the function of reducing power consumption in a standby state, and the conventional data transfer system cannot be applied to such MFPs.

SUMMARY OF THE INVENTION

According to an aspect of the present invention, a power supply control device arranged between a commercial power supply and an image forming apparatus includes a power conversion portion to convert power supplied from the commercial power supply from alternating current to direct current, a control portion supplied with power from the power conversion portion, a first communication portion supplied with power from the power conversion portion and connected to a network, a second communication portion connected to the image forming apparatus, and a device power supply switch arranged between the commercial power supply and the image forming apparatus. The control portion includes a mode decision portion to acquire a state of the image forming apparatus by communicating with the image forming apparatus through the second communication portion and to decide between a normal mode and a power-saving mode in which power consumption is smaller than in the normal mode, a positional information acquisition portion to acquire positional information allocated beforehand to the image forming apparatus to indicate a position on the network, a sleep switch portion to open the device power supply switch when the sleep mode is decided by the mode decision portion, an activation portion to close the device power supply switch in response to a packet including the positional information of the image forming apparatus being received by the first communication portion from the network, after the sleep mode is decided by the mode decision portion, a temporary storage control portion to temporarily store a packet including the positional information of the image forming apparatus, among packets received by the first communication portion from the network, after the sleep mode is decided by the mode decision portion, a packet transmission portion to transmit the temporarily stored packet through the second communication portion in response to the normal mode being decided by the mode decision portion, and a connection portion to connect the network connected to the first communication portion to the second communication portion after transmission by the packet transmission portion is finished.

According to another aspect of the present invention, a power supply control system includes the power supply control device described above and a sub-power supply control device. The power supply control device further includes a third communication portion connected to another image forming apparatus different from the image forming apparatus, and a signal output control portion to output an activation signal or a sleep transition signal to the sub-power supply control device. The sub-power supply control device includes a sub-power conversion portion to convert power supplied from a commercial power supply from alternating current to direct current, a sub-control portion supplied with power from the sub-power conversion portion, and a sub-device power supply switch arranged between the commercial power supply and another image forming apparatus. The mode decision portion of the control portion includes a remote mode decision portion to acquire a state of another image forming apparatus by communicating with another image forming apparatus through the third communication portion and to decide between a normal mode and a power-saving mode in which power consumption is smaller than in the normal mode. The sleep switch portion includes a remote sleep switch portion to allow the signal output control portion to output the sleep transition signal when the sleep mode is decided as a state of another image forming apparatus by the remote mode decision portion. The activation portion includes a remote activation portion to allow the signal output control portion to output the activation signal in response to detection of reception of a packet including positional information of another image forming apparatus by the first communication portion from the network, after the sleep mode is decided as a state of another image forming apparatus by the remote mode decision portion. The temporary storage control portion includes a remote temporary storage control portion to temporarily store a packet including positional information of another image forming apparatus, among packets received by the first communication portion from the network, after the sleep mode is decided as a state of another image forming apparatus by the remote mode decision portion. The packet transmission portion includes a remote packet transmission portion to transmit the packet temporarily stored by the remote temporary storage control portion to another image forming apparatus through the third communication portion, in response to the normal mode being decided as a state of another image forming apparatus by the remote mode decision portion. The connection portion includes a remote connection portion to connect the network connected to the first communication portion to the third communication portion, after transmission by the remote packet transmission portion is finished. The sub-control portion includes a power supply switch control portion to open the sub-device power supply switch in response to detection of a sleep transition signal output from the power supply control device and to close the sub-device power supply switch in response to detection of an activation signal output from the power supply control device.

According to a further aspect of the present invention, a power supply control method is performed in a power supply control device arranged between a commercial power supply and an image forming apparatus. The power supply control device includes a power conversion portion to convert power supplied from the commercial power supply from alternating current to direct current, a control portion supplied with power from the power conversion portion, a first communication portion supplied with power from the power conversion portion and connected to a network, a second communication portion connected to the image forming apparatus, and a device power supply switch arranged between the commercial power supply and the image forming apparatus. The power supply control method includes a mode decision step of acquiring a state of the image forming apparatus by communicating with the image forming apparatus through the second communication portion, and deciding between a normal mode and a power-saving mode in which power consumption is smaller than in the normal mode, a positional information acquisition step of acquiring positional information allocated beforehand to the image forming apparatus to indicate a position on the network, a sleep switch step of opening the device power supply switch when the sleep mode is decided in the mode decision step, an activation step of closing the device power supply switch in response to a packet including the positional information of the image forming apparatus being received by the first communication portion from the network, after the sleep mode is decided in the mode decision step, a temporary storage control step of temporarily storing a packet including the positional information of the image forming apparatus, among packets received by the first communication portion from the network, after the sleep mode is decided in the mode decision step, a packet transmission step of transmitting the temporarily stored packet through the second communication portion in response to the normal mode being decided in the mode decision step, and a connection step of connecting the network connected to the first communication portion to the second communication portion after transmission is finished in the packet transmission step.

According to yet another aspect of the present invention, a non-transitory computer-readable recording medium is encoded with a power supply control program performed by a control portion which controls a power supply control device arranged between a commercial power supply and an image forming apparatus. The power supply control device includes a power conversion portion to convert power supplied from the commercial power supply from alternating current to direct current, a first communication portion supplied with power from the power conversion portion and connected to a network, a second communication portion connected to the image forming apparatus, and a device power supply switch arranged between the commercial power supply and the image forming apparatus. The control portion is supplied with power from the power conversion portion. The power supply control program causes the control portion to execute: a mode decision step of acquiring a state of the image forming apparatus by communicating with the image forming apparatus through the second communication portion, and deciding between a normal mode and a power-saving mode in which power consumption is smaller than in the normal mode; a positional information acquisition step of acquiring positional information allocated beforehand to the image forming apparatus to indicate a position on the network; a sleep switch step of opening the device power supply switch when the sleep mode is decided in the mode decision step; an activation step of closing the device power supply switch in response to a packet including the positional information of the image forming apparatus being received by the first communication portion from the network, after the sleep mode is decided in the mode decision step; a temporary storage control step of temporarily storing a packet including the positional information of the image forming apparatus, among packets received by the first communication portion from the network, after the sleep mode is decided in the mode decision step; a packet transmission step of transmitting the temporarily stored packet through the second communication portion in response to the normal mode being decided in the mode decision step; and a connection step of connecting the network connected to the first communication portion to the second communication portion after transmission is finished in the packet transmission step.

The foregoing and other features, aspects, and advantages of the present invention will become more apparent from the following detailed description of the present invention when taken in conjunction with the accompanying drawings.

DESCRIPTION OF THE PREFERRED EMBODIMENTS

Figure 1:
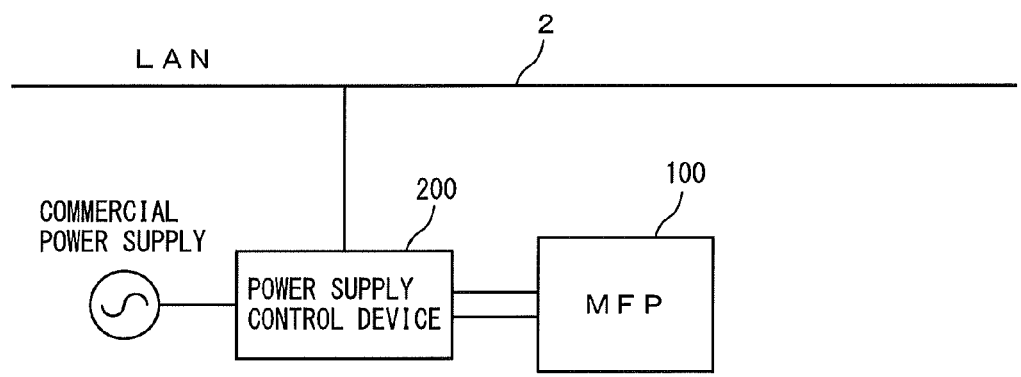
FIG. 1 is a diagram showing an example of an overview of a power supply control system in a first embodiment.

In the following, embodiments of the present invention will be described with reference to the figures. In the following description, the same parts are denoted with the same reference numerals. Their names and functions are also the same. Therefore, a detailed description thereof will not be repeated.

First Embodiment

FIG. 1 is a diagram showing an example of an overview of a power supply control system in a first embodiment. Referring to FIG. 1, a power supply control system 1 includes an MFP (Multi-Functional Peripheral) 100 and a power supply control device 200.

MFPs 100, 100A, 100B have the same hardware configuration and functions. Therefore, MFP 100 will be described as an example, unless otherwise specified. When MFP 100A is referred to, the same components and functions as those of MFP 100 are denoted with reference signs for MFP 100, followed by a letter "A." When MFP 100B is referred to, the same components and functions as those of MFP 100 are denoted with reference signs for MFP 100, followed by a letter "B."

MFP 100 is an example of electronic equipment driven by electric power supplied from a commercial power supply. MFP 100 functions as an image forming apparatus and includes a document scan function of scanning a document, an image forming function of forming an image on a recording medium such as paper based on image data, and a facsimile transmission/reception function of transmitting/receiving facsimile data. In the present embodiment, MFP 100 will be described as an example of electronic equipment. However, MFP 100 may be replaced with, for example, a printer, a facsimile machine, a PC, or any other device that includes a function of transmitting data.

Power supply control device 200 is connected between the commercial power supply and MFP 100 and switches between a state in which power is supplied from the commercial power supply to MFP 100 and a state in which power is not supplied to MFP 100. Power supply control device 200 is further connected between a Local Area Network (LAN) 2 and MFP 100 and switches between a state in which MFP 100 is connected to LAN 2 and a state in which MFP 100 is cut off from LAN 2. The connection to LAN 2 is either wired or wireless. LAN 2 may be a LAN using a Public Switched Telephone Network (PSTN). LAN 2 may be connected to the Internet through a gateway (G/W).

MFP 100 can transmit/receive data to/from another computer connected to LAN 2 or a computer connected to the Internet through LAN 2 in a state in which power supply control device 200 connects MFP 100 to LAN 2.

Figure 2:
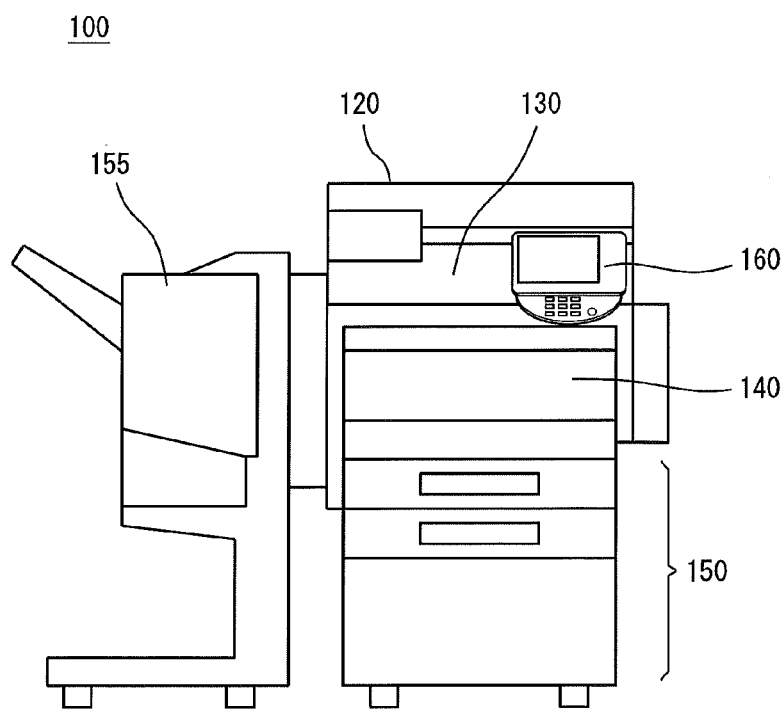
FIG. 2 is an external perspective view of an MFP.
Figure 3:
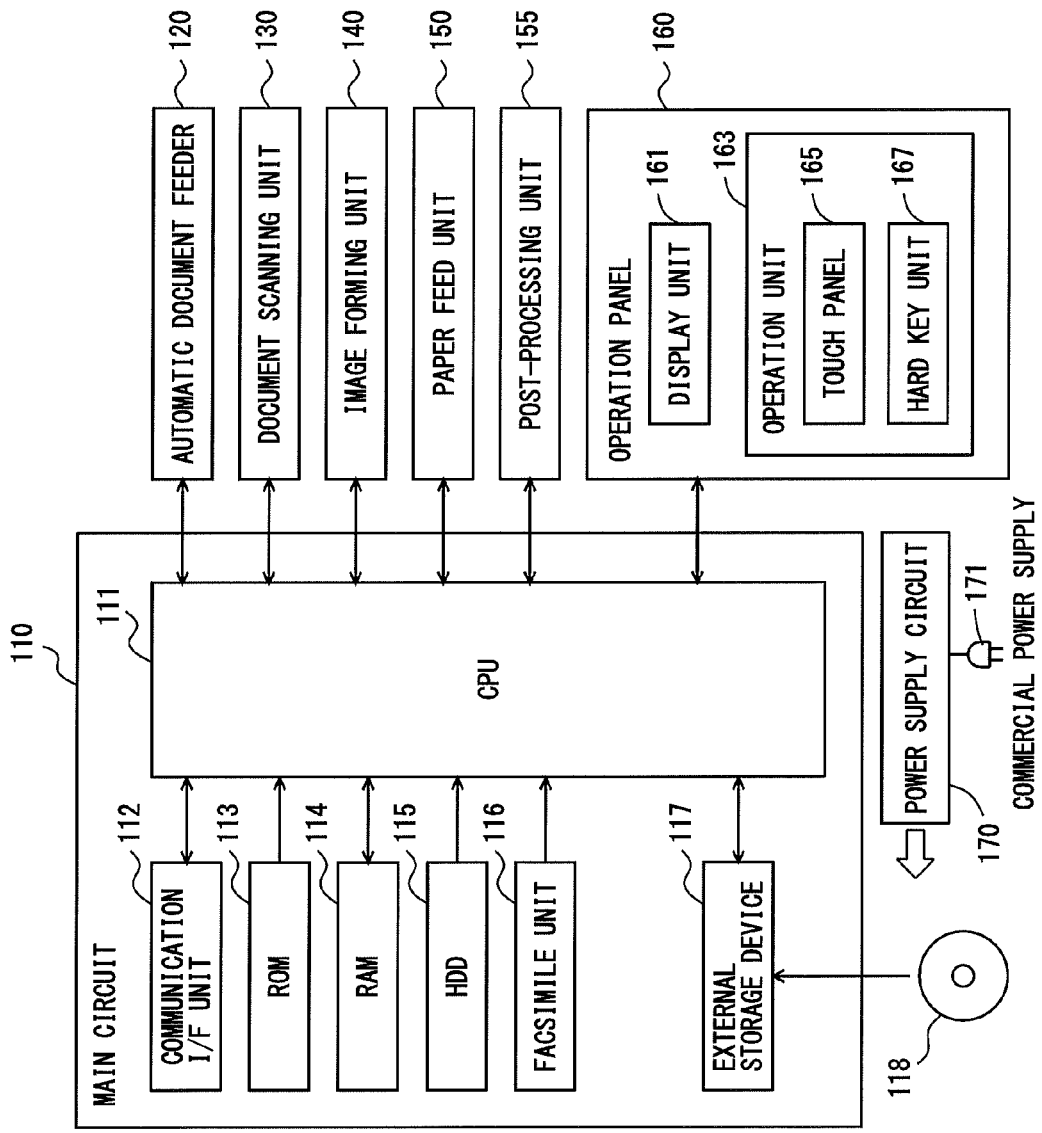
FIG. 3 is a block diagram showing an overall hardware configuration of the MFP.

FIG. 2 is an external perspective view of the MFP. FIG. 3 is a block diagram showing an overall hardware configuration of the MFP. Referring to FIG. 2 and FIG. 3, MFP 100 includes a main circuit 110, a document scanning unit 130 for scanning a document, an automatic document feeder 120 for conveying a document to document scanning unit 130, an image forming unit 140 for forming an image on a sheet of paper based on image data output by document scanning unit 130 scanning a document, a paper feed unit 150 for supplying paper to image forming unit 140, a post-processing unit 155 for processing paper having an image formed thereon, an operation panel 160 serving as a user interface, and a power supply circuit 170.

Power supply circuit 170 is connected to a commercial power supply through a power plug 171 and supplies power from the commercial power supply to main circuit 110, automatic document feeder 120, document scanning unit 130, image forming unit 140, paper feed unit 150, post-processing unit 155, and operation panel 160.

Post-processing unit 155 performs a sorting process of sorting one or more sheets of paper having images formed by image forming unit 140, and discharging the sorted paper, a punching process of punching holes, and a stapling process of pushing staples.

Main circuit 110 includes a CPU 111, a communication interface (I/F) unit 112, a ROM 113, a RAM 114, an HDD (Hard Disk Drive) 115 serving as a mass storage device, a facsimile unit 116, and an external storage device 117 to which a CD-ROM (Compact Disk Read Only Memory) 118 is attached. CPU 111 is connected to automatic document feeder 120, document scanning unit 130, image forming unit 140, paper feed unit 150, and operation panel 160 to control the entire MFP 100.

ROM 113 stores a program executed by CPU 111 or data necessary to execute the program. RAM 114 is used as a working area when CPU 111 executes a program. RAM 114 temporarily stores scan data (image data) successively sent from document scanning unit 130.

Operation panel 160 is provided on a top surface of MFP 100 and includes a display unit 161 and an operation unit 163. Display unit 161 is a display such as a Liquid Crystal Display (LCD) or an organic Electro-Luminescence Display (ELD) and displays instruction menus to users and information about the acquired image data. Operation unit 163 includes a plurality of keys and accepts input of a variety of instructions and data such as characters and numerals through the user's operation corresponding to the keys. Operation unit 163 further includes a touch panel provided on display unit 161.

Communication I/F unit 112 is an interface for connecting MFP 100 to LAN 2. CPU 111 transmits/receive data to/from another computer connected to LAN 2 through communication I/F unit 112 or a computer connected to the Internet through LAN 2.

Facsimile unit 116 is connected to a PSTN to transmit facsimile data to the PSTN or receive facsimile data from the PSTN. Facsimile unit 116 stores the received facsimile data into HDD 115 or outputs the same to image forming unit 140. Image forming unit 140 prints the facsimile data received by facsimile unit 116 on paper. Facsimile unit 116 also converts data stored in HDD 115 into facsimile data and transmits the converted data to a facsimile machine connected to the PSTN.

CD-ROM 118 is attached to external storage device 117. CPU 111 can access CD-ROM 118 through external storage device 117. CPU 111 loads a program stored in CD-ROM 118 attached to external storage device 117 into RAM 114 for execution. The medium encoded with the program executed by CPU 111 is not limited to CD-ROM 118 but may be an optical disk (MO (Magnetic Optical Disc)/MD (Mini Disc)/DVD (Digital Versatile Disc)), an IC card, an optical card, or a semiconductor memory such as a mask ROM, an EPROM (Erasable Programmable ROM), or an EEPROM (Electrically EPROM).

The program executed by CPU 111 is not limited to a program recorded on CD-ROM 118. Alternatively, a program stored in HDD 115 may be loaded into RAM 114 for execution. In this case, another computer connected to LAN 2 may overwrite the program stored in HDD 115 of MFP 100 or additionally write a new program. MFP 100 may download a program from another computer connected to LAN 2 and store the program into HDD 115. The program referred to here includes not only a program directly executable by CPU 111 but also a source program, a compressed program, an encrypted program, and the like.

Figure 4:
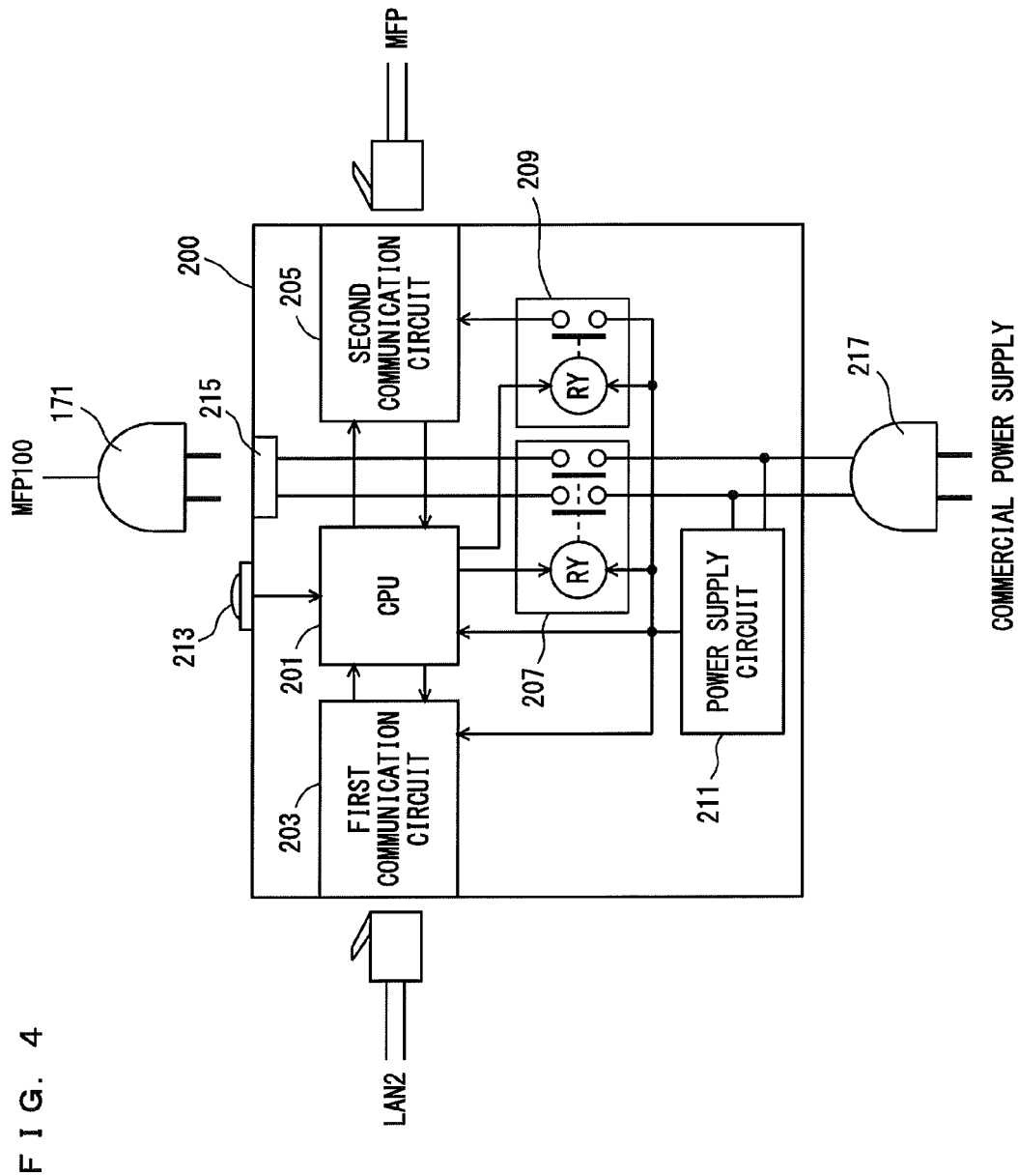
FIG. 4 is a block diagram showing an overall hardware configuration of a power supply control device.

FIG. 4 is a block diagram showing an overall hardware configuration of the power supply control device. Referring to FIG. 4, power supply control device 200 includes a Central Processing Unit (CPU) 201 controlling the entire power supply control device 200, a first communication circuit 203 connected to a communication cable that configures LAN 2, a second communication circuit 205 connected to a communication cable connected to MFP 100, a power output terminal 215 connected to power plug 171 of MFP 100, a power plug 217 connected to a socket of a commercial power supply, a power supply circuit 211 connected to power plug 217, a first switch circuit 207 provided between power plug 217 and power output terminal 215, a second switch circuit 209 provided between power supply circuit 211 and second communication circuit 205, and an operation button 213.

Power supply circuit 211 is connected with power plug 217. Power plug 217 is connected to the commercial power supply. Power supply circuit 211 receives electric power from the commercial power supply when power plug 217 is connected to the commercial power supply. The electric power supplied from the commercial power supply is alternating current (AC). Power supply circuit 211 is a converter for converting AC to direct current (DC). Power supply circuit 211 supplies DC power obtained by converting AC power from the commercial power supply, to CPU 201, first communication circuit 203, first switch circuit 207, second switch circuit 209, and second communication circuit 205.

CPU 201 is driven by power supplied from power supply circuit 211 and controls the entire power supply control device 200. The function of CPU 201, which will be detailed later, is to control first switch circuit 207 to switch the power supply of MFP 100 and to control second switch circuit 209, first communication circuit 203, and second communication circuit 205 to relay the communication of MFP 100.

First switch circuit 207 is provided between power plug 217 and power output terminal 215. Power output terminal 215 is connected with power plug 171 of MFP 100. First switch circuit 207 is driven by power supplied from power supply circuit 211 and is controlled by CPU 201 to open/close a circuit connecting power plug 217 and power output terminal 215. In a state in which first switch circuit 207 closes the circuit, power plug 217 is electrically connected with power output terminal 215. In a state in which first switch circuit 207 opens the circuit, power plug 217 is not electrically connected with power output terminal 215. Thus, when power plug 217 is connected to the commercial power supply and power output terminal 215 is connected with power plug 171 of MFP 100, power is supplied from the commercial power supply to MFP 100 in a state in which first switch circuit 207 closes the circuit, and power is not supplied from the commercial power supply to MFP 100 in a state in which first switch circuit 207 opens the circuit.

First communication circuit 203 is driven by power supplied from power supply circuit 211 and is connected with a communication cable that configures LAN 2. First communication circuit 203 receives a packet passing through LAN 2 and outputs the received packet to CPU 201. First communication circuit 203 sends a packet output from CPU 201 to LAN 2.

Second switch circuit 209 is provided between power supply circuit 211 and second communication circuit 205. Second switch circuit 209 is driven by power supplied from power supply circuit 211 and is controlled by CPU 201 to open/close a circuit connecting power supply circuit 211 and second communication circuit 205. In a state in which second switch circuit 209 closes the circuit, power supply circuit 211 is electrically connected with second communication circuit 205. In a state in which second switch circuit 209 opens the circuit, power supply circuit 211 is not electrically connected with second communication circuit 205. Thus, when power plug 217 is connected to the commercial power supply, power is supplied from power supply circuit 211 to second communication circuit 205 in a state in which second switch circuit 209 closes the circuit, and power is not supplied from power supply source 211 to second communication circuit 205 in a state in which second switch circuit 209 opens the circuit.

Second communication circuit 205 is driven by power supplied from power supply circuit 211 while second switch circuit 209 closes the circuit. Second communication circuit 205 is connected to the communication cable connected to MFP 100. Second communication circuit 205 receives a packet sent from MFP 100 and outputs the received packet to CPU 201. Second communication circuit 205 transmits a packet output from CPU 201 to MFP 100.

Operation button 213 is a button switch operated by the user. Operation button 213 outputs an OFF signal to CPU 201 while not being pressed by the user. Operation button 213 outputs an ON signal to CPU 201 when being pressed by the user.

Power supply circuit 211 supplies power to CPU 201, first communication circuit 203, first switch circuit 207, and second switch circuit 209 while first switch circuit 207 and second switch circuit 209 are open. Power consumed by power supply control device 200 while first switch circuit 207 and second switch circuit 209 are open is the sum of power consumed by CPU 201, first communication circuit 203, first switch circuit 207, and second switch circuit 209. The total power consumption is equal to or smaller than a predetermined power. The predetermined power is, for example, 0.5 W.

In the following description, power plug 217 is connected to the commercial power supply, power output terminal 215 is connected to power plug 171 of MFP 100, first communication circuit 203 is connected to a communication cable that configures LAN 2, and second communication circuit 205 is connected to the communication cable connected to communication I/F 112 of MFP 100, by way of example.

Since power plug 217 is connected to the commercial power supply, DC power is always supplied from power supply circuit 211 to CPU 201, first communication circuit 203, first switch circuit 207, and second switch circuit 209.

Figure 5:
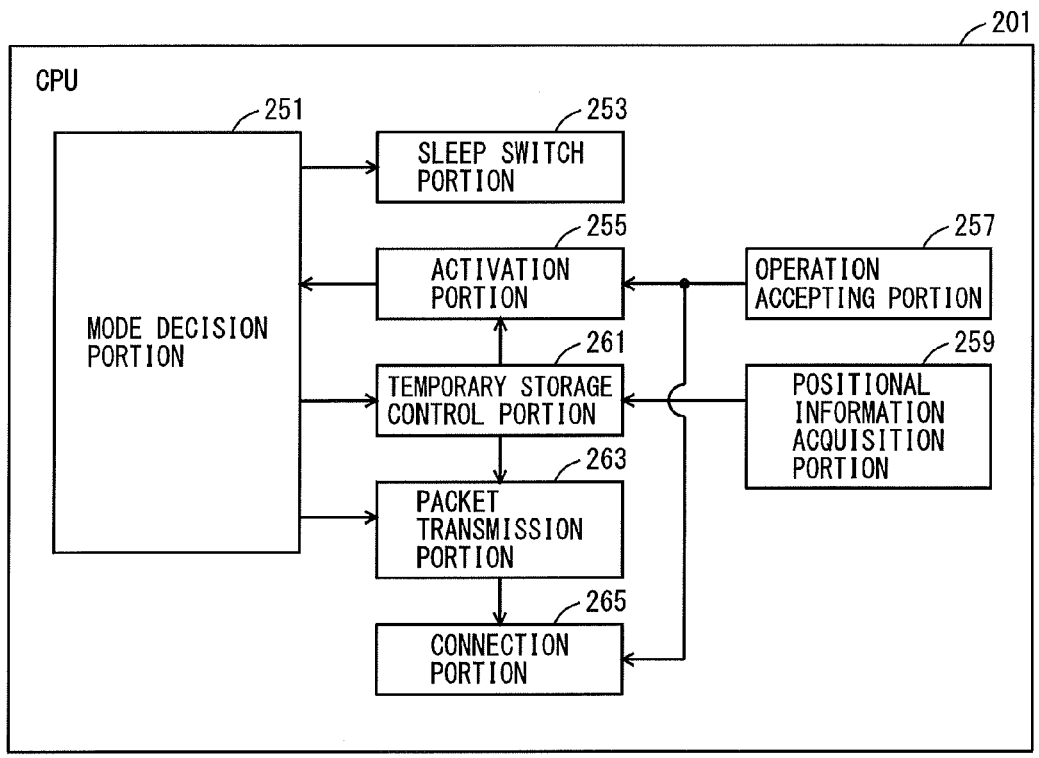
FIG. 5 is a block diagram showing an overview of functions of the CPU of the power supply control device.

FIG. 5 is a block diagram showing an overview of functions of the CPU of the power supply control device. The functions of CPU 201 shown in FIG. 5 are formed in CPU 201 when CPU 201 executes a power supply control program stored in the ROM of CPU 201. Referring to FIG. 5, CPU 201 includes a mode decision portion 251 for deciding an operation mode of MFP 100, a sleep switch portion 253, an activation portion 255, an operation accepting portion 257 for detecting a press by the user on operation button 213, a positional information acquisition portion 259 for acquiring positional information allocated to MFP 100 in the LAN, a temporary storage control portion 261 for temporarily storing a packet received by first communication circuit 203 from LAN 2, a packet transmission portion 263 for controlling second communication circuit 205 to transmit the temporarily stored packet, and a connection portion 265 for connecting first communication circuit 203 with second communication circuit 205.

Here, the functions of CPU 201 will be described, starting from a state in which first switch circuit 207 and second switch circuit 209 each close the circuit, for the sake of explanation. CPU 201 controls each of first switch circuit 207 and second switch circuit 209 to open/close the circuit.

In a state in which first switch circuit 207 is closed, power supplied from the commercial power supply is input to MFP 100, so that MFP 100 is driven by power supplied from the commercial power supply. In a state in which second switch circuit 209 is closed, second communication circuit 205 is driven, so that CPU 201 is ready to communicate with MFP 100.

Mode decision portion 251 communicates with MFP 100 through second communication circuit 205 and decides an operation mode of MFP 100. Therefore, mode decision portion 251 decides an operation mode while second communication circuit 205 is driven by receiving power supply. The operation modes of MFP 100 include a normal mode and a power-saving mode in which power consumption is smaller than in the normal mode. Power is not supplied to second communication circuit 205 after mode decision portion 251 switches the operation mode to the power-saving mode. Therefore, mode decision portion 251 communicates with MFP 100 through second communication circuit 205 and decides an operation mode of MFP 100 after receiving an activation completion signal from activation portion 255 described later.

In a case where MFP 100 can switch operation modes, mode decision portion 251 acquires an operation mode from MFP 100. In a case where MFP 100 cannot switch operation modes, mode decision portion 251 monitors the operation of MFP 100 to decide an operation mode. For example, mode decision portion 251 acquires an operating state of MFP 100 by inquiring of MFP 100 about an operating state through second communication circuit 205 and receiving an operating state returned by MFP 100. The normal mode is decided as the operation mode while MFP 100 is executing any one of an image forming process, a copy process, a scan process, a facsimile transmission/reception process, and a data transmission/reception process, or while MFP 100 is being operated by the user. The power-saving mode is decided as the operation mode while MFP 100 is not executing any one of an image forming process, a copy process, a scan process, a facsimile transmission/reception process, and a data transmission/reception process, or if a state in which MFP 100 is not being operated by the user continues for a predetermined time. After the operation mode is switched to the power-saving mode, mode decision portion 251 inquires of MFP 100 about an operating state through second communication circuit 205 after receiving an activation completion signal from activation portion 255 and decides on the normal mode at a time when receiving an operating state returned by MFP 100. Specifically, the normal mode is decided at a time when MFP 100 is activated to become ready to execute a data communication process after power is supplied to MFP 100.

When deciding on the power-saving mode as the operation mode of MFP 100, mode decision portion 251 outputs a sleep switch instruction to sleep switch portion 253 at a point of time when the operation mode of MFP 100 is switched from the normal mode to the power-saving mode. Mode decision portion 251 outputs the operation mode to temporary storage control portion 261 and packet transmission portion 263. In other words, mode decision portion 251 outputs being the normal mode to temporary storage control portion 261 and packet transmission portion 263 while the normal mode is decided, and mode decision portion 251 outputs being the power-saving mode to temporary storage control portion 261 and packet transmission portion 263 while the power-saving mode is decided.

Positional information acquisition portion 259 acquires positional information allocated beforehand to MFP 100 on LAN 2. The positional information is a network address and is, for example, an IP (Internet Protocol) address or a MAC (Media Access Control) address. Positional information acquisition portion 259 communicates with MFP 100 through second communication circuit 205 to acquire positional information from MFP 100 and stores the acquired positional information into the RAM of CPU 201. In a case where power supply control device 200 is remotely operated by a computer connected to LAN 2 through first communication circuit 203, the positional information of MFP 100 may be set from the computer. In a case where power supply control device 200 has a user interface such as a keyboard, the positional information of MFP 100 may be input by the user from the keyboard. Positional information acquisition portion 259 outputs the positional information of MFP 100 to temporary storage control portion 261.

Temporary storage control portion 261 receives the operation mode of MFP 100 from mode decision portion 251 and receives the positional information of MFP 100 from positional information acquisition portion 259. In a state in which the operation mode input from mode decision portion 251 indicates the power-saving mode, temporary storage control portion 261 temporarily stores a packet addressed to MFP 100 that is received by first communication circuit 203 from LAN 2, into the RAM of CPU 201. Specifically, temporary storage control portion 261 monitors a packet received by first communication circuit 203 from LAN 2, and, if the received packet includes the positional information of MFP 100 that is input from positional information acquisition portion 259, determines that the received packet is a packet addressed to MFP 100. In a state in which the operation mode input from mode decision portion 251 indicates the power-saving mode, temporary storage control portion 261 outputs an activation instruction to activation portion 255 and outputs a transmission instruction to packet transmission portion 263 in response to a packet addressed to MFP 100 being received by first communication circuit 203 from LAN 2.

After a transmission instruction is input from temporary storage control portion 261, packet transmission portion 263 transmits the packet stored in the RAM by temporary storage control portion 261 to MFP 100 through second communication circuit 205 in response to the operation mode input from mode decision portion 251 being switched to the normal mode. Packet transmission portion 263 outputs a connection instruction to connection portion 265 in response to completion of transmission of all the packets stored in the RAM by temporary storage control portion 261.

Connection portion 265 connects first communication circuit 203 with second communication circuit 205 in response to a connection instruction being input from packet transmission portion 263. MFP 100 is thus connected to LAN 2. Connection portion 265 also connects first communication circuit 203 with second communication circuit 205 in response to a connection instruction being input from operation accepting portion 257 described later.

Sleep switch portion 253 controls first switch circuit 207 to open the circuit and controls second switch circuit 209 to open the circuit, in response to a sleep switch instruction being input from mode decision portion 251. First switch circuit 207 is opened to open the circuit connecting power plug 217 and power output terminal 215, so that power supplied to MFP 100 is cut off and MFP 100 stops consuming power. Second switch circuit 209 is opened to open the circuit connecting power supply circuit 211 and second communication circuit 205, so that second communication circuit 205 stops being driven, thereby reducing power consumption.

Operation accepting portion 257 outputs an activation instruction to activation portion 255 and outputs a connection instruction to connection portion 265 when operation button 213 is pressed by the user.

Activation portion 255 controls first switch circuit 207 to close the circuit and controls second switch circuit 209 to close the circuit, in response to the activation instruction being input. Activation portion 255 outputs an activation completion signal to mode decision portion 251 after allowing first switch circuit 207 and second switch circuit 209 to be closed. The activation instruction may be input from temporary storage control portion 261 or input from operation accepting portion 257. First switch circuit 207 is closed to close the circuit connecting power plug 217 and power output terminal 215, so that power is supplied to MFP 100 to activate MFP 100. Second switch circuit 209 is closed to close the circuit connecting power supply circuit 211 and second communication circuit 205, so that second communication circuit 205 is driven, and CPU 201 becomes ready for communication with MFP 100. However, CPU 201 cannot communicate until MFP 100 becomes ready for communication after MFP 100 is supplied with power and then activated. Therefore, as described above, mode decision portion 251 inquires of MFP 100 about an operating state through second communication circuit 205, determines that MFP 100 is ready for communication at a point of time when receiving the operating state returned by MFP 100, and decides on the normal mode.

Figure 6:
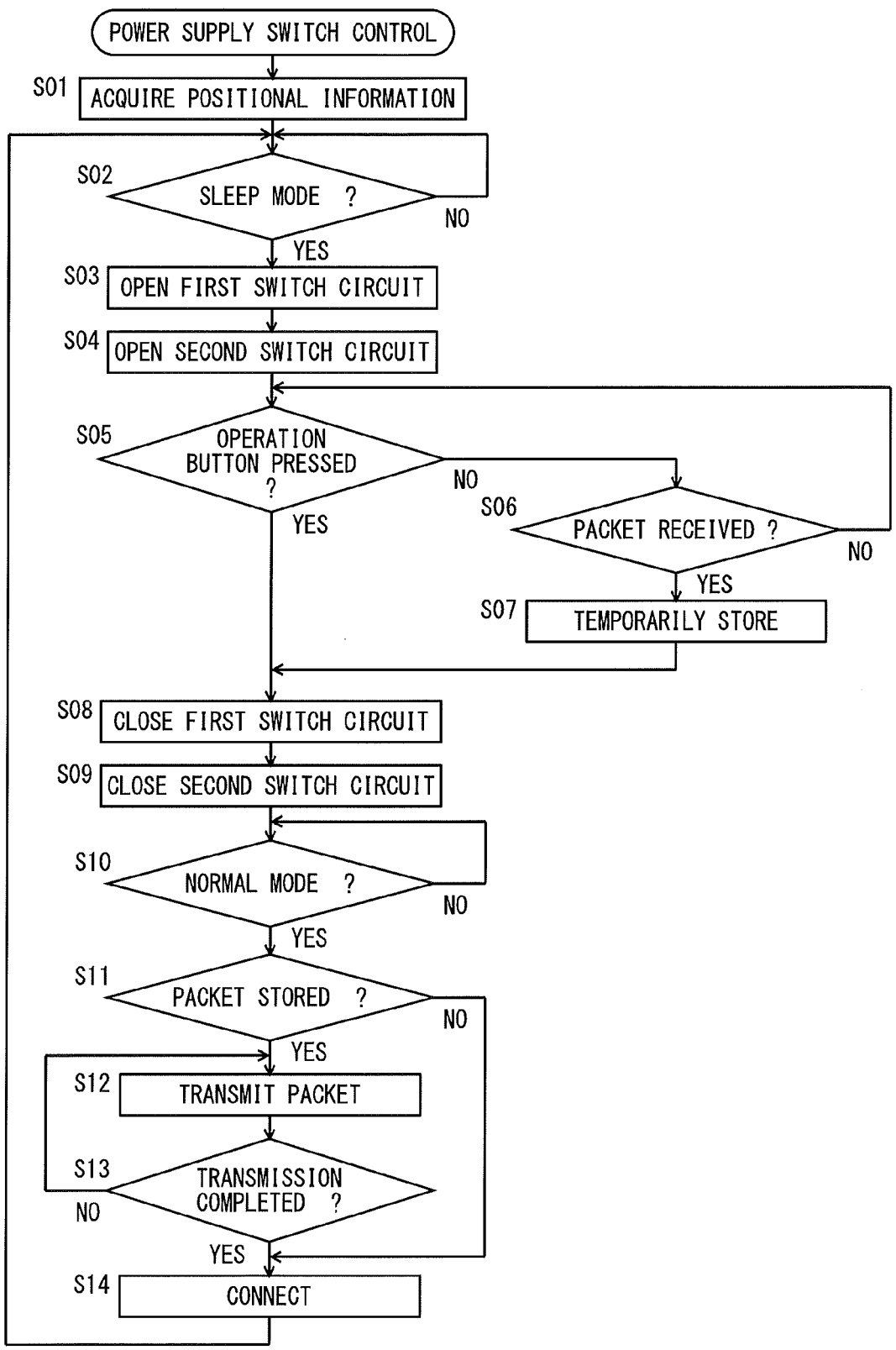
FIG. 6 is a flowchart showing an example of a flow of a power supply switch control process.

FIG. 6 is a flowchart showing an example of a flow of a power supply switch control process. The power supply switch control process is a process executed by CPU 201 when CPU 201 of power supply control device 200 executes the power supply control program stored in the ROM of CPU 201. Referring to FIG. 6, CPU 201 acquires the positional information of MFP 100 (step S01). The positional information is acquired from MFP 100 by communicating with MFP 100 through second communication circuit 205. Alternatively, the user may input the positional information of MFP 100 through remote operation or from the user interface of power supply control device 200.

In the next step S02, it is determined whether the operation mode of MFP 100 is the sleep mode. The operating state of MFP 100 is monitored by communicating with MFP 100 through second communication circuit 205 and acquiring the operating state from MFP 100. If a predetermined time has passed without MFP 100 executing a process or without accepting the user's operation, it is determined that the operation mode is the sleep mode. The process waits until it is determined that the operation mode of MFP 100 is the sleep mode (NO in step S02). The process proceeds to step S03 if it is determined that the operation mode is the sleep mode (YES in step S02).

In step S03, first switch circuit 207 is opened. As a result, the circuit connecting the commercial power supply and MFP 100 is opened, so that power supplied to MFP 100 is cut off, and MFP 100 stops consuming power.

In the next step S04, second switch circuit 209 is opened. As a result, the circuit connecting power supply circuit 211 and second communication circuit 205 is opened, so that power consumed in second communication circuit 205 can be reduced. Since MFP 100 is not driven, there is no need for driving second communication circuit 205.

In the next step S05, it is determined whether operation button 213 is pressed. If operation button 213 is pressed, the process proceeds to step S08. If not, the process proceeds to step S06.

In step S06, it is determined whether a packet addressed to MFP 100 is received. If a packet in which the positional information acquired in step S01 is set as a destination is received, it is determined that a packet addressed to MFP 100 is received. If a packet addressed to MFP 100 is received, the process proceeds to step S07. If not, the process returns to step S05. In step S07, the received packet is temporarily stored, and the process proceeds to step S08. The packet is stored into the RAM of CPU 201. The packet may be stored into a semiconductor memory such as an EEPROM provided separately from CPU 201. Even after the process proceeds to step S08, if a packet addressed to MFP 100 is received, all the received packets are stored into the RAM.

In step S08, first switch circuit 207 is closed. As a result, the circuit connecting the commercial power supply and MFP 100 is closed, so that power is supplied from the commercial power supply to MFP 100. MFP 100 thus becomes ready to be driven.

In the next step S09, second switch circuit 209 is closed. As a result, the circuit connecting power supply circuit 211 and second communication circuit 205 is closed, so that communication with MFP 100 becomes ready through second communication circuit 205.

In step S10, it is determined whether the operation mode of MFP 100 is the normal mode. The operating state is acquired from MFP 100 by communicating with MFP 100 through second communication circuit 205. If the operating state is received from MFP 100, it is determined that the operation mode is the normal mode. The process waits until it is determined that the operation mode of MFP 100 is the normal mode (NO in step S10). If it is determined that the operation mode is the normal mode (YES in step S10), the process proceeds to step S11. Therefore, if a packet addressed to MFP 100 is received upon execution of step S06, all the packets addressed to MFP 100 that are received by first communication circuit 203 are stored into the RAM until the normal mode is determined in step S10 after the packet is received. This can prevent loss of packets addressed to MFP 100.

In step S11, it is determined whether a packet addressed to MFP 100 is stored in the RAM. If a packet addressed to MFP 100 is stored in the RAM, the process proceeds to step S12. If not, the process proceeds to step S14. In step S12, the packet stored in the RAM is transmitted through second communication circuit 205. The packet is thus received by MFP 100. It is determined whether transmission of all the packets stored in the RAM has been completed (step S13). If transmission of the packets has not been completed (NO in step S13), the process returns to step S12. If transmission of the packets has been completed (YES in step S13), the process returns to step S14.

In step S14, first communication circuit 203 is connected with second communication circuit 205. The process then returns to step S02.

As described above, power supply control device 200 in the first embodiment includes power supply circuit 211 arranged between the commercial power supply and MFP 100 for converting AC power supplied from the commercial power supply to DC power, CPU 201 supplied with power from power supply circuit 211, first communication circuit 203 supplied with power from power supply circuit 211 and connected to LAN 2, second communication circuit 205 connected to MFP 100, and first switch circuit 207 arranged between the commercial power supply and MFP 100. CPU 201 includes mode decision portion 251 for acquiring a state of MFP 100 by communicating with MFP 100 through second communication circuit 205, and deciding between the normal mode and the power-saving mode in which power consumption is smaller than in the normal mode, positional information acquisition portion 259 for acquiring the network address allocated to MFP 100 beforehand, sleep switch portion 253 for opening first switch circuit 207 when the sleep mode is decided by mode decision portion 251, activation portion 255 for closing first switch circuit 207 in response to a packet including the network address of MFP 100 being received by first communication circuit 203 from the network after the sleep mode is decided by mode decision portion 251, temporary storage control portion 261 for temporarily storing a packet including the network address of MFP 100, among packets received by first communication circuit 203 from the network, after the sleep mode is decided by mode decision portion 251, packet transmission portion 263 for transmitting the temporarily stored packet to MFP 100 through second communication circuit 295 in response to the normal mode being decided by mode decision portion 251, and connection portion 265 for connecting LAN 2 connected to first communication circuit 203 to second communication circuit 205 after transmission by packet transmission portion 263 is finished.

Accordingly, power consumption of MFP 100 can be reduced because first switch circuit 207 is opened when the sleep mode is decided as the operation mode of MFP 100. MFP 100 can be driven because first switch circuit 207 is closed in response to a packet including the network address of MFP 100 being received from LAN 2 after the sleep mode is decided. Furthermore, among packets received from LAN 2, a packet including the network address of MFP 100 is temporarily stored, and the temporarily stored packet is transmitted to MFP 100 in response to the normal mode of MFP 100 being decided. After transmission is finished, LAN 2 is connected to second communication circuit 205. This ensures that a packet transmitted to MFP 100 is received by MFP 100.

Power supply control device 200 further includes second switch circuit 209 provided between second communication circuit 205 and power supply circuit 211. Mode decision portion 251 communicates with MFP 100 through second communication circuit 205 while first switch circuit 207 is closed. Sleep switch circuit 253 opens second switch circuit 209 in addition to first switch circuit 207 when the sleep mode is decided by mode decision portion 251. Activation portion 255 closes second switch circuit 209 in addition to first switch circuit 207 in response to a packet including the network address of MFP 100 being received by first communication circuit 203 from LAN 2, after the sleep mode is decided by mode decision portion 251.

Accordingly, power consumed for communication with MFP 100 can be reduced.

Power supply control device 200 further includes operation switch 213 for accepting an operation by the user. Activation portion 255 closes first switch circuit 207 and second switch circuit 209 in response to operation switch 213 being pressed by the user. Connection portion 265 connects LAN 2 connected to first communication circuit 203 to second communication circuit 205 in response to operation switch 213 being pressed by the user.

Accordingly, when an operation by the user is accepted, first switch circuit 207 and second switch circuit 209 are closed, and LAN 2 is connected to second communication circuit 205, whereby the user's operation allows MFP 100 to become ready for communication.

Second Embodiment

In power supply control system 1 in the first embodiment, power supply of MFP 100 alone is controlled. In a power supply control system 1A in a second embodiment, respective power supplies of a plurality of MFP 100, 100A, 100B are controlled. In the following, differences from power supply control system 1 in the first embodiment will be mainly described. In power supply control system 1A in the second embodiment, the same components and functions as in power supply control system 1 in the first embodiment are denoted with the same reference signs.

Figure 7:
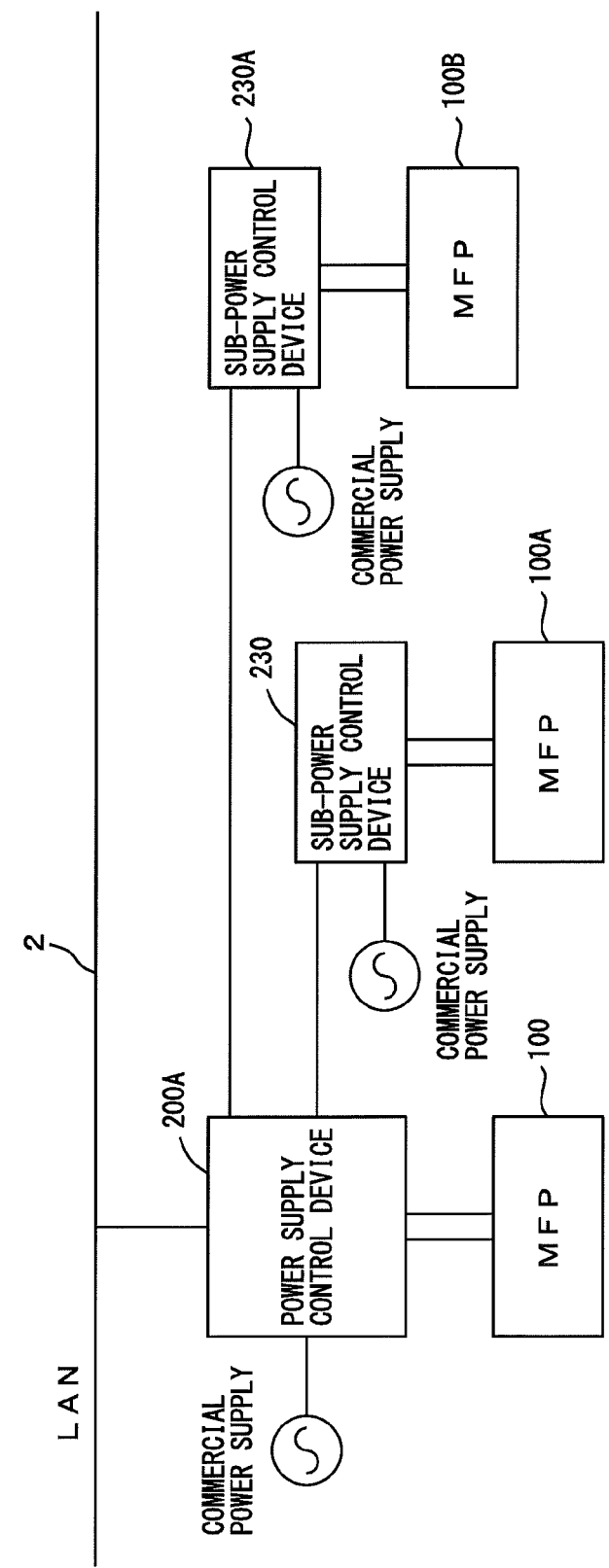
FIG. 7 is a diagram showing an example of an overview of a power supply control system in a second embodiment.

FIG. 7 is a diagram showing an example of an overview of power supply control system 1A in the second embodiment. Referring to FIG. 7, power supply control system 1A in the second embodiment includes three MFPs 100, 100A, 100B, a power supply control device 200A, and two sub-power supply control devices 230, 230A.

MFPs 100, 100A, 100B are electronic equipment driven by power supplied from a commercial power supply and here, have the same hardware configuration and functions.

Power supply control device 200A is connected between the commercial power supply and MFP 100 and switches between a state in which power from the commercial power supply is supplied to MFP 100 and a state in which power is not supplied to MFP 100. Power supply control device 200A is further connected between LAN 2 and MFP 100 and further switches between a state in which MFP 100 is connected to LAN 2 and a state in which MFP 100 is cut off from LAN 2. Power supply control device 200A has a hub controller for dividing LAN 2 into a plurality of branches. One of the branches of LAN 2 divided by the hub controller of power supply control device 200A is connected to sub-power supply control device 230 through a communication cable, and another is connected to sub-power supply control device 230A through a communication cable.

Sub-power supply control device 230 is connected between a commercial power supply and MFP 100A and switches between a state in which power from the commercial power supply is supplied to MFP 100A and a state in which power is not supplied to MFP 100A. Sub-power supply control device 230 is further connected between power supply control device 200 and MFP 100A and switches between a state in which MFP 100A is connected to LAN 2 and a state in which MFP 100A is cut off from LAN 2.

Sub-power supply control device 230A is connected between the commercial power supply and MFP 100B and switches between a state in which power from the commercial power supply is supplied to MFP 100B and a state in which power is not supplied to MFP 100B. Sub-power supply control device 230A is further connected between power supply control device 200 and MFP 100B and switches between a state in which MFP 100B is connected to LAN 2 and a state in which MFP 100B is cut off from LAN 2.

Sub-power supply control device 230 and sub-power supply control device 230A differ in that they are connected to different devices, namely, MFP 100A and 100B, respectively, and have the same hardware and functions. Therefore, in the following, sub-power supply control device 230 will be described by way of example, unless otherwise specified.

Figure 8:
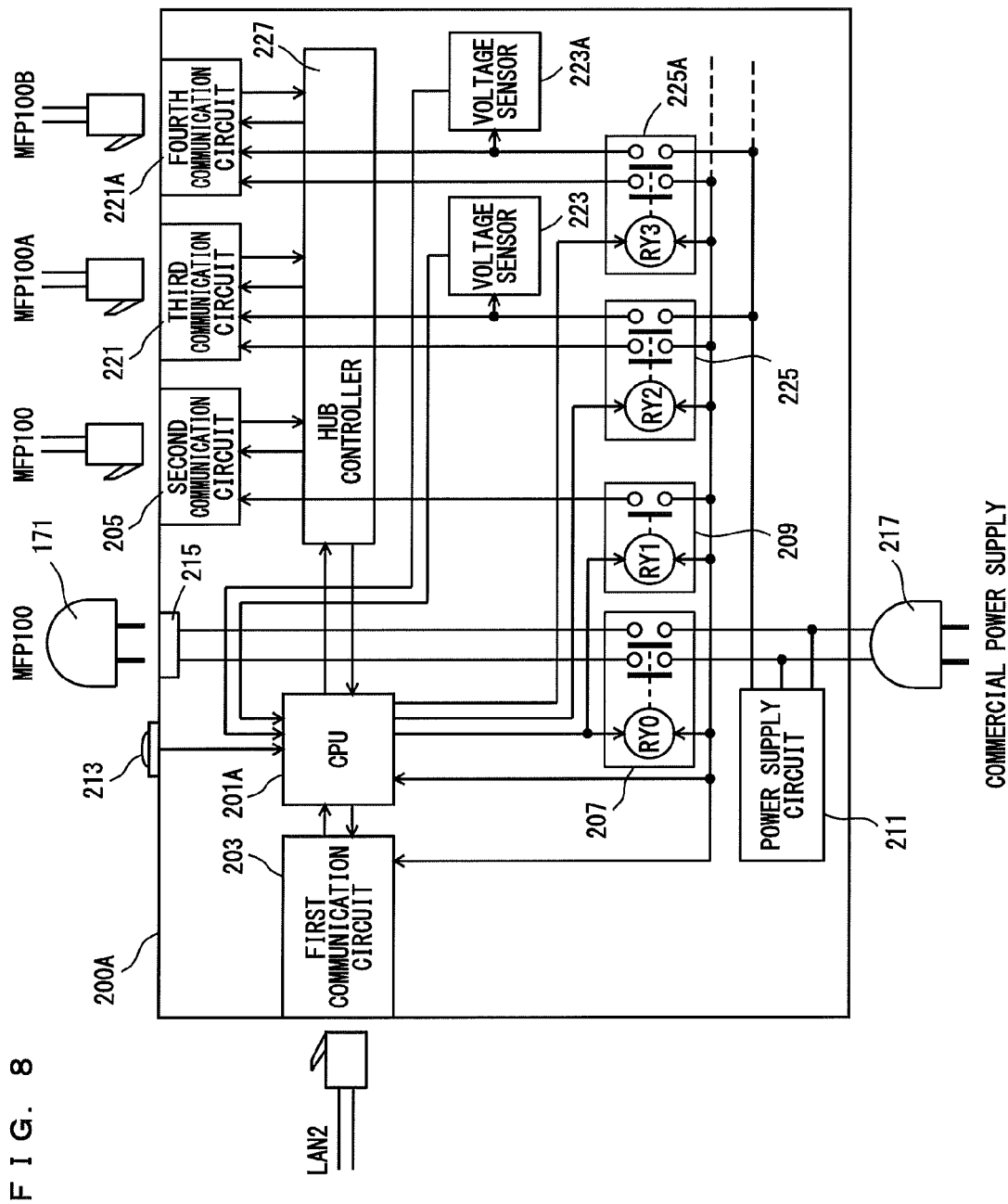
FIG. 8 is a block diagram showing an overview of a hardware configuration of a power supply control device in the second embodiment.

FIG. 8 is a block diagram showing an overview of a hardware configuration of the power supply control device in the second embodiment. Referring to FIG. 8, power supply control device 200A differs from power supply control device 200 in the first embodiment shown in FIG. 4 in that CPU 201 is changed to a CPU 201A, and that it additionally includes a third communication circuit 221 connected to a communication cable connected with MFP 100A, a fourth communication circuit 221A connected with a communication cable connected to MFP 100B, a hub controller 227, a first sub-communication power supply switch circuit 225, a second sub-communication power supply switch 225A, and voltage sensors 223, 223A.

CPU 201A is driven by power supplied from power supply circuit 211 and controls the entire power supply control device 200A. The function of CPU 201A, which will be detailed later, is to control first switch circuit 207 to switch the power supply of MFP 100 and to control second switch circuit 209, first communication circuit 203, and second communication circuit 205 to relay the communication of MFP 100. CPU 201A further controls first sub-communication power supply switch circuit 225, first communication circuit 203, and third communication circuit 221 to relay the communication of MFP 100A and controls second sub-communication power supply switch circuit 225A, first communication circuit 203, and fourth communication circuit 221A to relay the communication of MFP 100B.

First communication circuit 203 is driven by power supplied from power supply circuit 211 and is connected with a communication cable that configures LAN 2. First communication circuit 203 receives a packet passing through LAN 2 and outputs the received packet to CPU 201A. First communication circuit 203 sends a packet output from CPU 201A to LAN 2.

Second communication circuit 205 is driven by power supplied from power supply circuit 211 while second switch circuit 209 closes the circuit. Second communication circuit 205 is connected to the communication cable connected to MFP 100. Second communication circuit 205 receives a packet sent from MFP 100 and outputs the received packet to CPU 201A through hub controller 227. Second communication circuit 205 receives a packet output from CPU 201A through the hub controller and transmits the received packet to MFP 100 through the communication cable.

First sub-communication power supply switch circuit 225 is provided between power supply circuit 211 and third communication circuit 221. First sub-communication power supply switch circuit 225 is driven by power supplied from power supply circuit 211 and is controlled by CPU 201A to open/close the circuit connecting power supply circuit 211 and third communication circuit 221. First sub-communication power supply switch circuit 225 includes a drive power supply switch for opening/closing a circuit connecting a first terminal of power supply circuit 211 and a power supply input terminal of third communication circuit 221, and a signal switch for opening/closing a circuit connecting a second terminal of power supply circuit 211 and a predetermined terminal of a connector connected with the communication cable of third communication circuit 221. First sub-communication power supply switch circuit 225 simultaneously opens/closes the drive power supply switch and the signal switch. First sub-communication power supply switch circuit 225 may open/close the drive power supply switch and the signal switch separately. The first terminal of power supply circuit 211 outputs power at a predetermined voltage for driving third communication circuit 221. The second terminal of power supply circuit 211 outputs power at a predetermined voltage defined by the PoE (Power over Ethernet®) standard. The predetermined terminal of the connector connected with the communication cable is a terminal defined by the PoE standard. The voltage defined by the PoE standard is hereinafter referred to as PoE voltage, and the predetermined terminal of the connector connected with the communication cable is referred to as the PoE terminal.

In a state in which the drive power supply switch of first sub-communication power supply switch circuit 225 closes the circuit, the first terminal of power supply circuit 211 is electrically connected with third communication circuit 221. In a state in which the signal switch closes the circuit, the second terminal of power supply circuit 211 is electrically connected with the PoE terminal of the connector connected with the communication cable of third communication circuit 221. In a state in which the drive power supply switch of first sub-communication power supply switch circuit 225 opens the circuit, the first terminal of power supply circuit 211 is not electrically connected with third communication circuit 221. In a state in which the signal switch opens the circuit, the second terminal of power supply circuit 211 is not electrically connected with the PoE terminal of third communication circuit 221. Therefore, when power plug 217 is connected to the commercial power supply, power is supplied from power supply circuit 211 to third communication circuit 221 in a state in which the drive power supply switch of first sub-communication power supply switch circuit 225 closes the circuit, and the PoE voltage is applied to the PoE terminal of third communication circuit 221 in a state in which the signal switch closes the circuit. Power is not supplied from power supply circuit 211 to third communication circuit 221 in a state in which the drive power supply switch of first sub-communication power supply switch circuit 225 opens the circuit, and the PoE voltage is not applied to the PoE terminal of third communication circuit 221 in a state in which the signal switch opens the circuit.

Third communication circuit 221 is driven by power supplied from power supply circuit 211 while the drive power supply switch of first sub-communication power supply switch circuit 225 closes the circuit. Third communication circuit 221 is connected with the communication cable connected to MFP 100A. Third communication circuit 221 receives a packet sent from MFP 100A and outputs the received packet to CPU 201A through hub controller 227. Third communication circuit 221 receives a packet output from CPU 201A through hub controller 227 and transmits the received packet to MFP 100A through the communication cable.

Voltage sensor 223 is provided between the PoE terminal of third communication circuit 221 and first sub-communication power supply switch circuit 225 and detects a voltage of the PoE terminal of third communication circuit 221. Voltage sensor 223 outputs the detected voltage to CPU 201A.

Second sub-communication power supply switch circuit 225A is provided between power supply circuit 211 and fourth communication circuit 221A. Second sub-communication power supply switch circuit 225A is driven by power supplied from power supply circuit 211 and is controlled by CPU 201A to open/close a circuit connecting power supply circuit 211 and third communication circuit 221A. Second sub-communication power supply switch circuit 225A includes a drive power supply switch for opening/closing a circuit connecting the first terminal of power supply circuit 211 and a power supply input terminal of fourth communication circuit 221A, and a signal switch for opening/closing a circuit connecting the second terminal of power supply circuit 211 and a predetermined terminal of a connector connected to the communication cable of fourth communication circuit 221A. Second sub-communication power supply switch circuit 225A simultaneously opens/closes the drive power supply switch and the signal switch. Second sub-communication power supply switch circuit 225A may open/close the drive power supply switch and the signal switch separately.

In a state in which the drive power supply switch of second sub-communication power supply switch circuit 225A closes the circuit, the first terminal of power supply circuit 211 is electrically connected with fourth communication circuit 221A. In a state in which the signal switch closes the circuit, the second terminal of power supply circuit 211 is electrically connected with the PoE terminal of the connector connected to the communication cable of fourth communication circuit 221A. In a state in which the drive power supply switch of second sub-communication power supply switch circuit 225A opens the circuit, the first terminal of power supply circuit 211 is not electrically connected with fourth communication circuit 221A. In a state in which the signal switch opens the circuit, the second terminal of power supply circuit 211 is not electrically connected with the PoE terminal of fourth communication circuit 221A. Therefore, when power plug 217 is connected to the commercial power supply, power is supplied from power supply circuit 211 to fourth communication circuit 221A in a state in which the drive power supply switch of second sub-communication power supply switch circuit 225A closes the circuit, and the PoE voltage is applied to the PoE terminal of fourth communication circuit 221A in a state in which the signal switch closes the circuit. Power is not supplied from power supply circuit 211 to fourth communication circuit 221A in a state in which the drive power supply switch of second sub-communication power supply switch circuit 225A opens the circuit, and the PoE voltage is not applied to the PoE terminal of fourth communication circuit 221A in a state in which the signal switch opens the circuit.

Fourth communication circuit 221A is driven by power supplied from power supply circuit 211 while the drive power supply switch of second sub-communication power supply switch circuit 225A closes the circuit. Fourth communication circuit 221A is connected with the communication cable connected to MFP 100B. Fourth communication circuit 221A receives a packet sent from MFP 100B and outputs the received packet to CPU 201A through hub controller 227. Fourth communication circuit 221A receives a packet output from CPU 201A through hub controller 227 and transmits the received packet to MFP 100B through the communication cable.

Voltage sensor 223A is provided between the PoE terminal of fourth communication circuit 221A and second sub-communication power supply switch circuit 225A and detects a voltage of the PoE terminal of fourth communication circuit 221A. Voltage sensor 223A outputs the detected voltage to CPU 201A.

Power supply circuit 211 supplies power to CPU 201, first communication circuit 203, first switch circuit 207, second switch circuit 209, first sub-communication power supply switch circuit 225, and second sub-communication power supply switch circuit 225A while first switch circuit 207, second switch circuit 209, first sub-communication power supply switch circuit 225, and second sub-communication power supply switch circuit 225A are open. Power consumed by power supply control device 200 while first switch circuit 207 and second switch circuit 209 are open is the sum of power consumed by CPU 201, first communication circuit 203, first switch circuit 207, second switch circuit 209, first sub-communication power supply switch 225, and second sub-communication power supply switch circuit 225A. The total power consumption is equal to or smaller than a predetermined power. The predetermined power is, for example, 0.5 W.

In the following description, power plug 217 is connected to the commercial power supply, power output terminal 215 is connected with power plug 171 of MFP 100, first communication circuit 203 is connected with a communication cable that configures LAN 2, second communication circuit 205 is connected to the communication cable connected to communication I/F 112 of MFP 100, third communication circuit 221 is connected with the communication cable connected to communication I/F 112 of MFP 100A, and fourth communication circuit 221A is connected with the communication cable connected to communication I/F 112 of MFP 100B, by way of example.

Since power plug 217 is connected to the commercial power supply, DC power is always supplied from power supply circuit 211 to CPU 201, first communication circuit 203, first switch circuit 207, second switch circuit 209, first sub-communication power supply switch circuit 225, and second sub-communication power supply switch circuit 225A.

Figure 9:
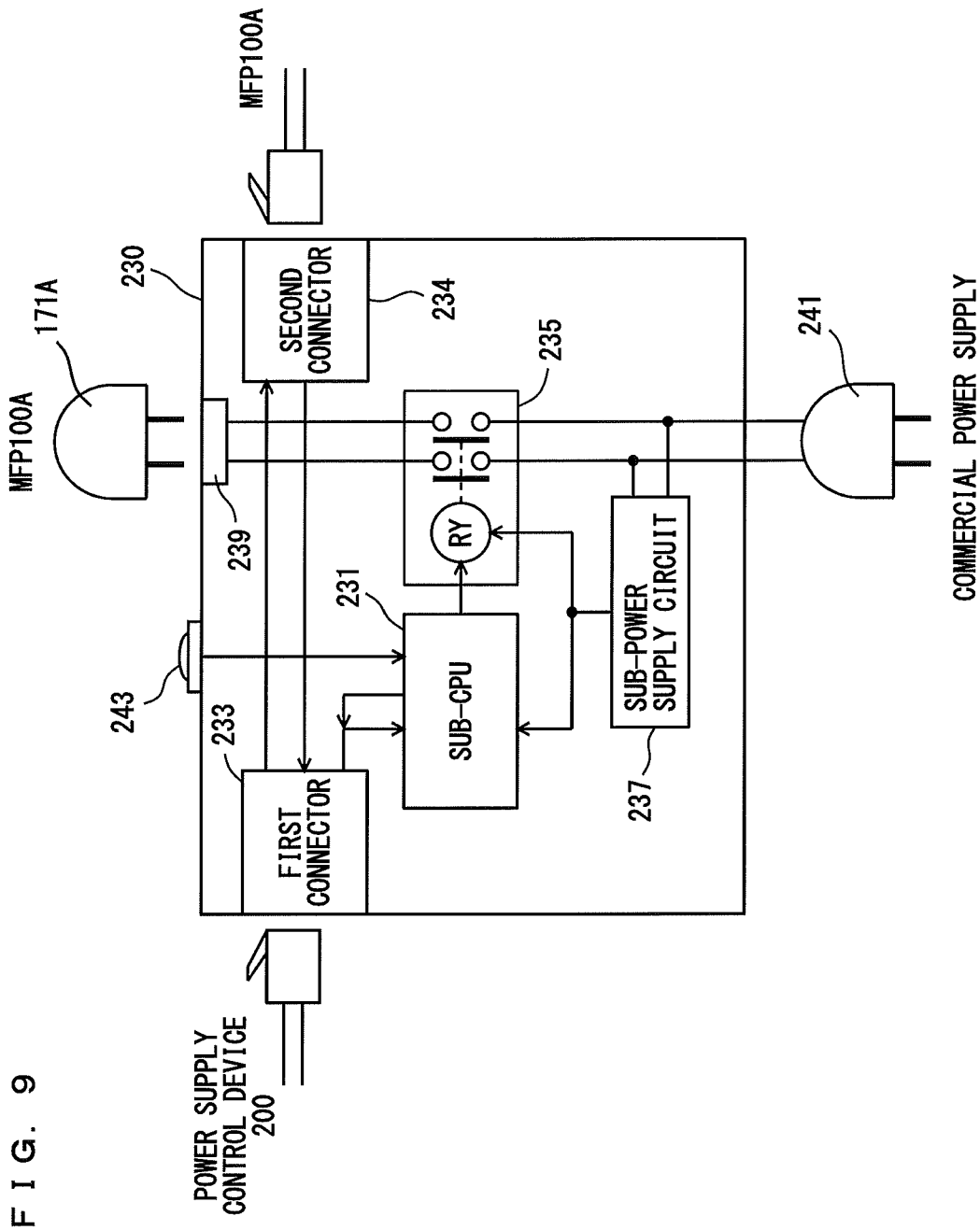
FIG. 9 is a block diagram showing an overview of a hardware configuration of a sub-power supply control device in the second embodiment.

FIG. 9 is a block diagram showing an overview of a hardware configuration of the sub-power supply control device in the second embodiment. Referring to FIG. 9, sub-power supply control device 230 includes a sub-CPU 231 for controlling the entire sub-power supply control device 230, a first connector 233 connected with third communication circuit 221 of power supply control device 200A through a communication cable, a second connector 234 connected with the communication cable connected to MFP 100A, a sub-power plug 241 connected to a socket of a commercial power supply, a sub-power supply circuit 237 connected with sub-power plug 241, a sub-power output terminal 239 connected with power plug 171A of MFP 100A, a sub-device switch circuit 235 provided between sub-power plug 241 and sub-power output terminal 239, and a sub-operation button 243.

Sub-power supply circuit 237 is connected with sub-power plug 241. Sub-power plug 241 is connected to the commercial power supply. Sub-power supply circuit 237 is supplied with power from the commercial power supply when sub-power plug 241 is connected to the commercial power supply. Power supplied from the commercial power supply is AC. Sub-power supply circuit 237 is a converter for converting AC to DC. Sub-power supply circuit 237 supplies DC power obtained by converting AC power supplied from the commercial power supply, to sub-CPU 231 and sub-device switch circuit 235.

Sub-CPU 231 is driven by power supplied from sub-power supply circuit 231 and controls the entire sup-power supply control device 230. The function of sub-CPU 231, which will be detailed later, is to control switch circuit 235 to switch the power supply of MFP 100A. Sub-CPU 231 detects a voltage of the PoE terminal of first connector 233 and applies the PoE voltage to the PoE terminal of first connector 233.

Sub-device switch circuit 235 is provided between sub-power plug 241 and sub-power output terminal 239. Sub-power output terminal 239 is connected with power plug 171A of MFP 100A. Sub-device switch circuit 235 is driven by power supplied from sub-power supply circuit 237 and is controlled by sub-CPU 231 to close/open a circuit connecting sub-power plug 241 and sub-power output terminal 239. In a state in which sub-device switch circuit 235 closes the circuit, sub-power plug 241 is electrically connected with sub-power output terminal 239. In a state in which sub-device switch circuit 235 opens the circuit, sub-power plug 241 is not electrically connected with sub-power output terminal 239. Therefore, when sub-power plug 241 is connected to the commercial power supply and sub-power output terminal 239 is connected with power plug 171A of MFP 100A, power is supplied from the commercial power supply to MFP 100A in a state in which sub-device switch circuit 235 closes the circuit, and power is not supplied from the commercial power supply to MFP 100A in a state in which sub-device switch circuit 235 opens the circuit.

First connector 233 and second connector 234 are connected with each other. Therefore, when the communication cable connected with MFP 100A is connected to second connector 234 and the communication cable connected to third communication circuit 221 of power supply control device 200 is connected to first connector 233, MFP 100A is connected to LAN 2 through power supply control device 200.

Figure 10:
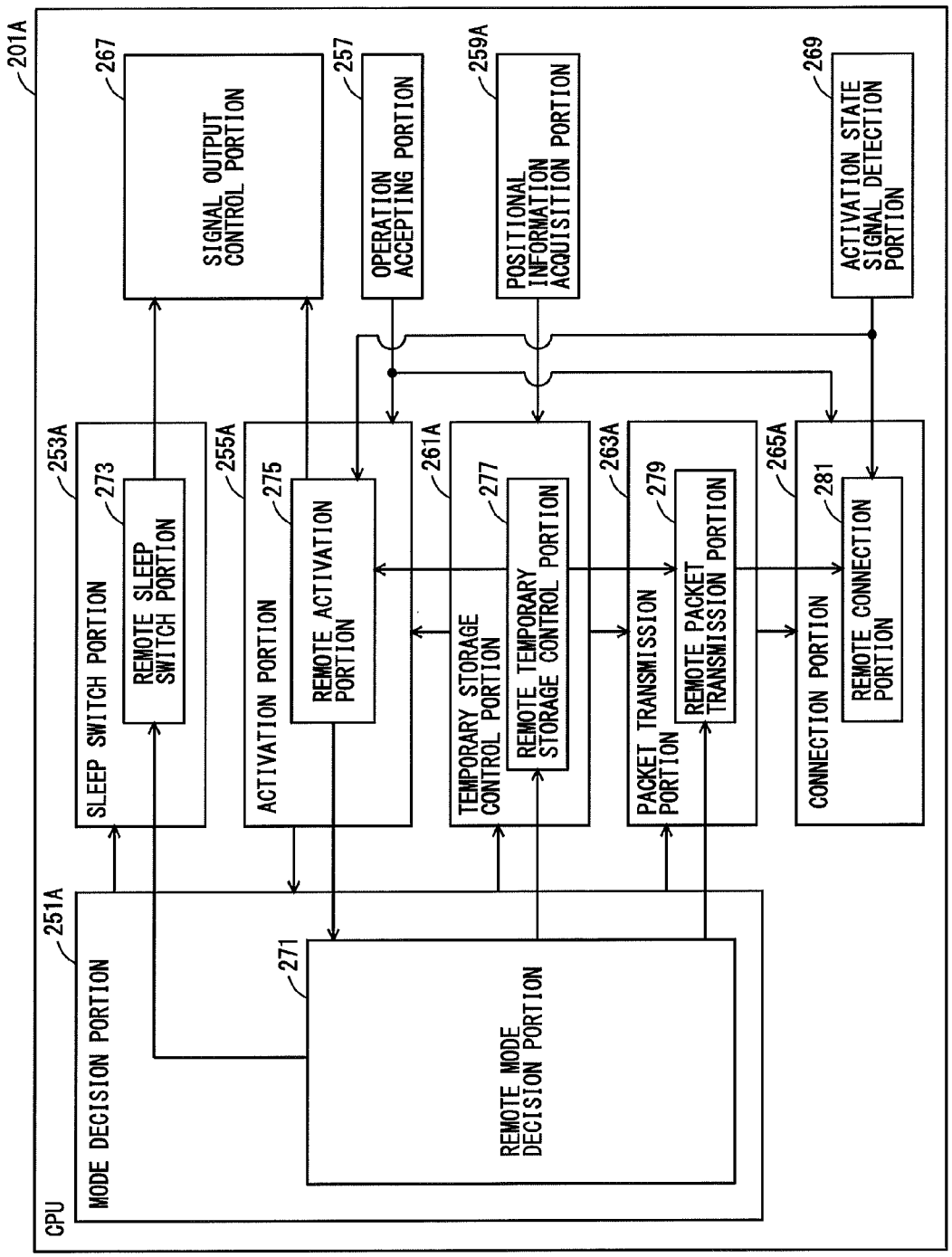
FIG. 10 is a block diagram showing an overview of functions of the CPU of the power supply control device in the second embodiment.

FIG. 10 is a block diagram showing an overview of functions of the CPU of the power supply control device in the second embodiment. The functions of CPU 201A shown in FIG. 10 differ from the functions of CPU 201 shown in FIG. 5 in that mode decision portion 251, sleep switch portion 253, activation portion 255, positional information acquisition portion 259, temporary storage control portion 261, packet transmission portion 263, and connection portion 265 are changed to a mode decision portion 251A, a sleep switch portion 253A, an activation portion 255A, a positional information acquisition portion 259A, a temporary storage control portion 261A, a packet transmission portion 263A, and a connection portion 265A, and in that a signal output control portion 267 and an activation state signal detection portion 269 are added.

Here, the functions of CPU 201A will be described, starting from a state in which first switch circuit 207, second switch circuit 209, first sub-communication power supply switch circuit 225, and second sub-communication power supply switch circuit 225A close the respective circuits, for the sake of explanation. CPU 201A controls each of first switch circuit 207, second switch circuit 209, first sub-communication power supply switch circuit 225, and second sub-communication power supply switch circuit 225A to open/close the circuit.

In a state in which first switch circuit 207 is closed, power supplied from the commercial power supply is input to MFP 100, so that MFP 100 is driven by power supplied from the commercial power supply. In a state in which second switch circuit 209 is closed, second communication circuit 205 is driven, so that CPU 201A is ready for communication with MFP 100. In a state in which first sub-communication power supply switch circuit 225 is closed, third communication circuit 221 is driven, so that CPU 201A is ready for communication with MFP 100A. In a state in which second sub-communication power supply switch circuit 225A is closed, fourth communication circuit 221A is driven, so that CPU 201A is ready for communication with MFP 100B.

Mode decision portion 251A includes a remote mode decision portion 271, in addition to the function of mode decision portion 251 in the first embodiment. Remote mode decision portion 271 communicates with MFP 100A through third communication circuit 221 and decides an operation mode of MFP 100A. Therefore, remote mode decision portion 271 decides an operation mode of MFP 100A while third communication circuit 221 is driven by receiving power supply. Furthermore, remote mode decision portion 271 communicates with MFP 100B through fourth communication circuit 221A and decides an operation mode of MFP 100B. Therefore, remote mode decision portion 271 decides an operation mode of MFP 100B while fourth communication circuit 221A is driven by receiving power supply.

Power is not supplied to third communication circuit 221 after remote mode decision portion 271 decides on the power-saving mode as the operation mode of MFP 100A. Therefore, the operation mode of MFP 100A is decided by communicating with MFP 100A through third communication circuit 221 after an activation completion signal is input from remote activation portion 275 described later to MFP 100A. Power is not supplied to fourth communication circuit 221A after remote mode decision portion 271 decides on the power-saving mode as the operation mode. Therefore, the operation mode of MFP 100B is decided by communicating with MFP 100B after an activation completion signal is input from remote activation portion 275 described later to MFP 100B.

In a case where the power-saving mode is decided as the operation mode of MFP 100A, remote mode decision portion 271 outputs a sleep switch instruction designating MFP 100A to sleep switch portion 253A at a point of time when the operation mode of MFP 100A switches from the normal mode to the power-saving mode. In a case where the power-saving mode is decided as the operation mode of MFP 100B, remote mode decision portion 271 outputs a sleep switch instruction designating MFP 100B to sleep switch portion 253A at a point of time when the operation mode of MFP 100B switches from the normal mode to the power-saving mode.

Remote mode decision portion 271 outputs the respective operation modes of MFP 100A and MFP 100B to temporary storage control portion 261 and packet transmission portion 263. In other words, while the normal mode is decided as the operation mode of MFP 100A, remote mode decision portion 271 outputs that MFP 100A is in the normal mode to temporary storage control portion 261A and packet transmission portion 263A. While the power-saving mode is decided as the operation mode of MFP 100A, remote mode decision portion 271 outputs that MFP 100A is in the power-saving mode to temporary storage control portion 261A and packet transmission portion 263A. Similarly, while the normal mode is decided as the operation mode of MFP 100B, remote mode decision portion 271 outputs that MFP 100B is in the normal mode to temporary storage control portion 261A and packet transmission portion 263A. While the power-saving mode is decided as the operation mode of MFP 100B, remote mode decision portion 271 outputs that MFP 100B is in the power-saving mode to temporary storage control portion 261A and packet transmission portion 263A.

Positional information acquisition portion 259A acquires positional information allocated beforehand to each of MFP 100A and MFP 100B on LAN 2. Positional information acquisition portion 259A acquires positional information from MFP 100A by communicating with MFP 100A through third communication circuit 221, acquires positional information from MFP 100B by communicating with MFP 100B through fourth communication circuit 221A, and stores the positional information of MFP 100A and the positional information of MFP 100B into the RAM of CPU 201A. In a case where power supply control device 200A is remotely operated by a computer connected to LAN 2 through first communication circuit 203, the respective positional information of MFP 100A and MFP 100B may be set from the computer. In a case where power supply control device 200A has a user interface such as a keyboard, the user may input the positional information of MFP 100A and MFP 100B from the keyboard. Positional information acquisition portion 259A outputs the respective positional information of MFP 100A and MFP 100B to temporary storage control portion 261A.

Temporary storage control portion 261A includes a remote temporary storage control portion 277 in addition to the function of temporary storage control portion 261 in the first embodiment. Remote temporary storage control portion 277 receives the respective operation modes of MFP 100A and MFP 100B from remote mode decision portion 271 and receives the respective positional information of MFP 100A and MFP 100B from positional information acquisition portion 259A. Remote temporary storage control portion 277 temporarily stores a packet addressed to MFP 100A that is received by first communication circuit 203 from LAN 2, into the RAM of CPU 201A in a state in which the operation mode of MFP 100A input from remote mode decision portion 271 indicates the power-saving mode. Remote temporary storage control portion 277 temporarily stores a packet addressed to MFP 100B that is received by first communication circuit 203 from LAN 2, into the RAM of CPU 201A in a state in which the operation mode of MFP 100B input from remote mode decision portion 271 indicates the power-saving mode. Specifically, remote temporary storage control portion 277 monitors a packet received by first communication circuit 203 from LAN 2, and, if the received packet includes the positional information of MFP 100A input from positional information acquisition portion 259, determines that the received packet is a packet addressed to MFP 100A, and, if the received packet includes the positional information of MFP 100B input from positional information acquisition portion 259, determines that the received packet is a packet addressed to MFP 100B.

Remote temporary storage control portion 277 outputs an activation instruction designating MFP 100A to activation portion 255A and outputs a transmission instruction designating MFP 100A to packet transmission portion 263A in response to first communication circuit 203 receiving a packet addressed to MFP 100A from LAN 2 in a state in which the operation mode of MFP 100A input from remote mode decision portion 271 indicates the power-saving mode. Similarly, remote temporary storage control portion 277 outputs an activation instruction designating MFP 100B to activation portion 255A and outputs a transmission instruction designating MFP 100B to packet transmission portion 263A in response to first communication circuit 203 receiving a packet addressed to MFP 100B from LAN 2 in a state in which the operation mode of MFP 100B input from remote mode decision portion 271 indicates the power-saving mode.

Packet transmission portion 263A includes a remote packet transmission portion 279 in addition to the function of packet transmission portion 263 in the first embodiment. Remote packet transmission portion 279 transmits a packet addressed to MFP 100A that is stored in the RAM by remote temporary storage control portion 277, to MFP 100A through third communication circuit 221, in response to the operation mode of MFP 100A input from remote mode decision portion 271 being switched to the normal mode, after a transmission instruction designating MFP 100A is input from remote temporary storage control portion 277. Remote packet transmission portion 279 outputs a connection instruction designating MFP 100A to connection portion 265A, in response to completion of transmission of all the packets addressed to MFP 100A that are stored in the RAM by temporary storage control portion 261. Similarly, remote packet transmission portion 279 transmits a packet addressed to MFP 100B that is stored in the RAM by remote temporary storage control portion 277, to MFP 100B through fourth communication circuit 221A, in response to the operation mode of MFP 100B input from remote mode decision portion 271 being switched to the normal mode, after a transmission instruction designating MFP 100B is input from remote temporary storage control portion 277. Remote packet transmission portion 279 outputs a connection instruction designating MFP 100B to connection portion 265A, in response to completion of transmission of all the packets addressed to MFP 100B that are stored in the RAM by temporary storage control portion 261.

Connection portion 265A includes a remote connection portion 281 in addition to the function of connection portion 265 in the first embodiment. Remote connection portion 281 connects first communication circuit 203 with third communication circuit 221, in response to a connection instruction designating MFP 100A being input from remote packet transmission portion 279. Remote connection portion 281 connects first communication circuit 203 with third communication circuit 221, in response to a connection instruction designating MFP 100A being input from activation state signal detection portion 269 as described later. MFP 100A is thus connected to LAN 2.

Similarly, remote connection portion 281 connects first communication circuit 203 with fourth communication circuit 221A in response to a connection instruction designating MFP 100B being input from remote packet transmission portion 279. Remote connection portion 281 connects first communication circuit 203 with fourth communication circuit 221A in response to a connection instruction designating MFP 100B being input from activation state signal detection portion 269 described later. MFP 100B is thus connected to LAN 2.

Signal output control portion 267 outputs an activation signal or a sleep transition signal to each of MFP 100A and MFP 100B. Here, signal output control portion 267 outputs an activation signal to MFP 100A by applying the PoE voltage to the PoE terminal of third communication circuit 221 and outputs a sleep transition signal to MFP 100A by not applying the PoE voltage to the PoE terminal of third communication circuit 221. Similarly, signal output control portion 267 outputs an activation signal to MFP 100B by applying the PoE voltage to the PoE terminal of fourth communication circuit 221A and outputs a sleep transition signal to MFP 100B by not applying the PoE voltage to the PoE terminal of fourth communication circuit 221A. Specifically, signal output control portion 267 outputs an activation signal to MFP 100A by closing the signal switch of first sub-communication power supply switch circuit 225 and outputs a sleep switch signal to MFP 100A by opening the signal switch of first sub-communication power supply switch circuit 225. Similarly, signal output control portion 267 outputs an activation signal to MFP 100B by closing the signal switch of second sub-communication power supply switch circuit 225A and outputs a sleep switch signal to MFP 100B by opening the signal switch of second sub-communication power supply switch circuit 225A.

Sleep switch portion 253A includes a remote sleep switch portion 273 in addition to the function of sleep switch portion 253 in the first embodiment. Remote sleep switch portion 273 controls signal output control portion 267 to allow MFP 100A to output a sleep transition signal and opens the drive power supply switch of first sub-communication power supply switch circuit 225, in response to a sleep switch instruction designating MFP 100A being input from remote mode decision portion 271. The drive power supply switch of first sub-communication power supply switch circuit 225 opens the circuit to stop driving of third communication circuit 221, thereby reducing power consumption. Similarly, remote sleep switch portion 273 controls signal output control portion 267 to allow MFP 100B to output a sleep transition signal and opens the drive power supply switch of second sub-communication power supply switch circuit 225A, in response to a sleep switch instruction designating MFP 100B being input from remote mode decision portion 271. The drive power supply switch of second sub-communication power supply switch circuit 225A is opened to stop driving of fourth communication circuit 221A, thereby reducing power consumption.

Activation state signal detection portion 269 detects an activation state signal output from each of sub-power supply control devices 230 and 230A. Specifically, activation state signal detection portion 269 detects an activation state signal output by sub-power supply control device 230 if the voltage detected by voltage sensor 223 is the PoE voltage. Activation state signal detection portion 269, detecting the activation state signal output by sub-power supply control device 230, outputs an activation instruction designating MFP 100A to activation portion 255A and outputs a connection instruction designating MFP 100A to connection portion 265A. Similarly, activation state signal detection portion 269 detects an activation state signal output by sub-power supply control device 230A if the voltage detected by voltage sensor 223A is the PoE voltage. Activation state signal detection portion 269, detecting the activation state signal output by sub-power supply control device 230A, outputs an activation instruction designating MFP 100B to activation portion 255A and outputs a connection instruction designating MFP 100B to connection portion 265A.

Activation portion 255A includes a remote activation portion 275 in addition to the function of activation portion 255 in the first embodiment. Remote activation portion 275 controls signal output control portion 267 to allow MFP 100A to output an activation signal and closes the drive power supply switch of first sub-communication power supply switch circuit 225, in response to an activation instruction designating MFP 100A being input. The activation instruction designating MFP 100A may be input from remote temporary storage control portion 277 or input from activation state signal detection portion 269. After closing the drive power supply switch of first sub-communication power supply switch circuit 225, remote activation portion 275 outputs an activation completion signal designating MFP 100A to remote mode decision portion 271. The drive power supply switch of first sub-communication power supply switch circuit 225 is closed to close the circuit connecting power supply circuit 211 and third communication circuit 221, so that third communication circuit 221 is driven, and CPU 201A becomes ready for communication with MFP 100A. However, CPU 201A cannot communicate until MFP 100A becomes ready for communication after MFP 100A is supplied with power and then activated. Therefore, remote mode decision portion 271 inquires of MFP 100A about the operating state through third communication circuit 221, determines that MFP 100A is ready for communication at a point of time when receiving the operating state returned by MFP 100A, and decides on the normal mode.

Similarly, remote activation portion 275 controls signal output control portion 267 to allow MFP 100B to output an activation signal and closes the drive power supply switch of second sub-communication power supply switch circuit 225A, in response to an activation instruction designating MFP 100B being input. The activation instruction designating MFP 100B may be input from remote temporary storage control portion 277 or input from activation state signal detection portion 269. After closing the drive power supply switch of second sub-communication power supply switch circuit 225A, remote activation portion 275 outputs an activation completion signal designating MFP 100B to remote mode decision portion 271. The drive power supply switch of second sub-communication power supply switch circuit 225A is closed to close the circuit connecting power supply circuit 211 and fourth communication circuit 221A, so that fourth communication circuit 221A is driven, and CPU 201A becomes ready for communication with MFP 100B. However, CPU 201A cannot communicate until MFP 100B becomes ready for communication after MFP 100B is supplied with power and then activated. Therefore, as described above, remote mode decision portion 271 inquires of MFP 100B about the operating state through fourth communication circuit 221A, determines that MFP 100B is ready for communication at a point of time when receiving the operating state returned by MFP 100B, and decides on the normal mode.

In the second embodiment, first sub-communication power supply switch circuit 225 and second sub-communication power supply switch circuit 225A each open/close the drive power supply switch and the signal switch separately. However, first sub-communication power supply switch circuit 225 and second sub-communication power supply switch circuit 225A each may open/close the drive power supply switch and the signal switch simultaneously. In this case, signal output control portion 267 is not necessary because remote sleep switch portion 273 can open/close first sub-communication power supply switch circuit 225 and second sub-communication power supply switch circuit 225A. Specifically, in a state in which first sub-communication power supply switch circuit 225 closes the circuit, power supply circuit 211 is electrically connected with third communication circuit 221, and the PoE voltage is applied to the PoE terminal of third communication circuit 221. In a state in which first sub-communication power supply switch circuit 225 opens the circuit, power supply circuit 211 is not electrically connected with third communication circuit 221, and the PoE voltage is not applied to the PoE terminal of third communication circuit 221. Similarly, in a state in which second sub-communication power supply switch circuit 225A closes the circuit, power supply circuit 211 is electrically connected with fourth communication circuit 221A, and the PoE voltage is applied to the PoE terminal of fourth communication circuit 221A. In a state in which second sub-communication power supply switch circuit 225A opens the circuit, power supply circuit 211 is not electrically connected with fourth communication circuit 221A, and the PoE voltage is not applied to the PoE terminal of third communication circuit 221. Therefore, remote sleep switch portion 273 allows first sub-communication power supply switch circuit 225 to open the circuit in response to a sleep switch instruction designating MFP 100A being input from remote mode decision portion 271 and allows second sub-communication power supply switch circuit 225A to open the circuit in response to a sleep switch instruction designating MFP 100B being input from remote mode decision portion 271. Similarly, remote activation portion 275 allows first sub-communication power supply switch circuit 225 to close the circuit in response to an activation instruction designating MFP 100A being input from remote temporary storage control portion 277 or activation state signal detection portion 269, and allows second sub-communication power supply switch circuit 225A to close the circuit in response to an activation instruction designating MFP 100B being input from remote temporary storage control portion 277 or activation state signal detection portion 269.

Figure 11:
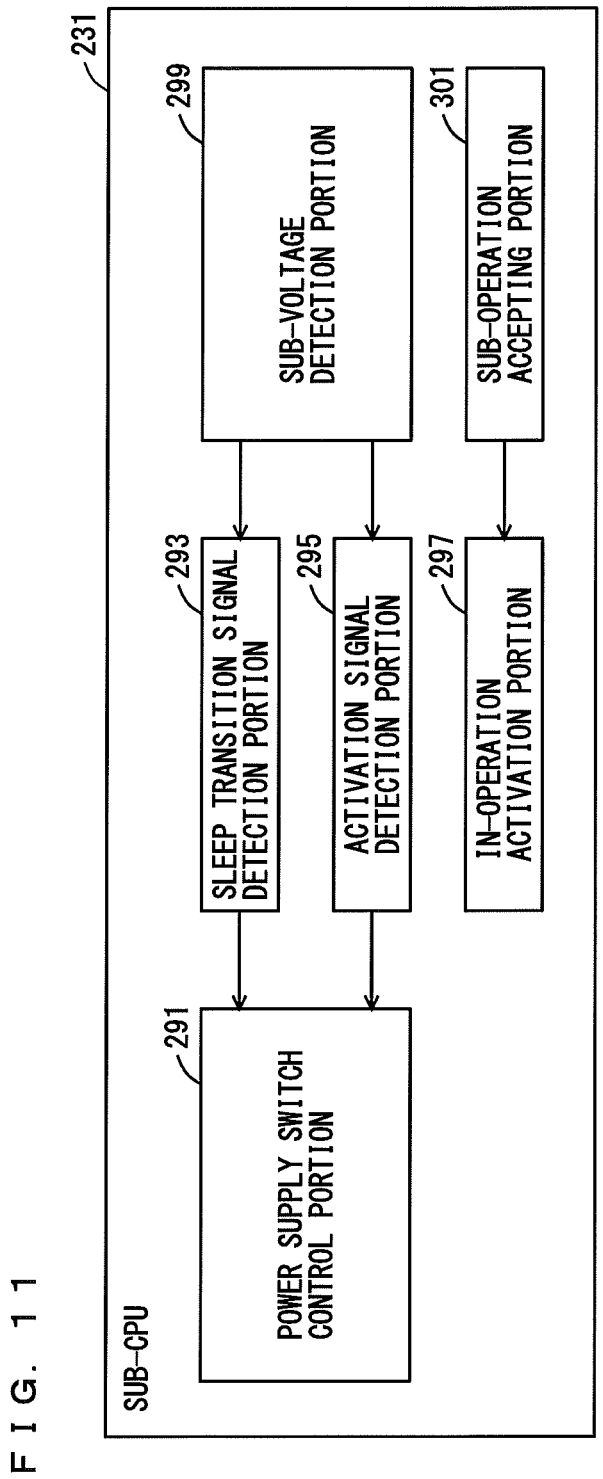
FIG. 11 is a block diagram showing an overview of functions of the sub-CPU of the sub-power supply control device in the second embodiment.

FIG. 11 is a block diagram showing an overview of functions of the sub-CPU of the sub-power supply control device in the second embodiment. Referring to FIG. 11, sub-CPU 231 of sub-power supply control device 230 includes a power supply switch control portion 291 for controlling sub-device switch circuit 235, a sub-voltage detection portion 299, a sleep transition signal detection portion 293, an activation signal detection portion 295, a sub-operation accepting portion 301, and an in-operation activation portion 297.

Sub-voltage detection portion 299 detects a voltage of the PoE terminal of first connector 233. Sub-voltage detection portion 299 outputs the detected voltage of the PoE terminal of first connector 233 to sleep transition signal detection portion 293 and activation signal detection portion 295.

Sleep transition signal detection portion 293 detects a sleep transition signal in response to the voltage value input from sub-voltage detection portion 299 changing from the PoE voltage to a voltage different from the PoE voltage, and outputs a sleep transition instruction to power supply switch control portion 291 in response to the sleep transition signal being detected.

Activation signal detection portion 295 detects an activation signal in response to the voltage value input from sub-voltage detection portion 299 changing from the voltage different from the PoE voltage to the PoE voltage, and outputs an activation instruction to power supply switch control portion 291 in response to the activation signal being detected. Activation signal detection portion 295 outputs an activation instruction to power supply switch control portion 291 while the voltage value input from sub-voltage detection portion 299 is the PoE voltage.

Sub-operation accepting portion 301 outputs an activation instruction to in-operation activation portion 297 when the user presses sub-operation button 243. In-operation activation portion 297 outputs an activation state signal to power supply control device 200 in response to an activation instruction being input. Specifically, in-operation activation portion 297 outputs an activation state signal by applying the PoE voltage to the PoE terminal of first connector 233.

Power supply switch control portion 291 controls sub-device switch circuit 235 to open the circuit in response to a sleep transition instruction being input from sleep transition signal detection portion 293. In a state in which sub-device switch circuit 235 opens the circuit, sub-power plug 241 is not electrically connected with sub-power output terminal 239. Therefore, when sub-power plug 241 is connected to the commercial power supply and sub-power output terminal 239 is connected with power plug 171A of MFP 100A, power is not supplied from the commercial power supply to MFP 100A in a state in which sub-device switch circuit 235 opens the circuit, so that power consumed by MFP 100A can be reduced.

Power supply switch control portion 291 controls sub-device switch circuit 235 to close the circuit in response to an activation instruction being input from activation signal detection portion 295. While an activation instruction is input from activation signal detection portion 295, power supply switch control portion 291 allows sub-device switch circuit 235 to close the circuit. In a state in which sub-device switch circuit 235 closes the circuit, sub-power plug 241 is electrically connected with sub-power output terminal 239. Therefore, when sub-power plug 241 is connected to the commercial power supply and sub-power output terminal 239 is connected to power plug 171 of MFP 100A, power is supplied from the commercial power supply to MFP 100A to drive MFP 100A in a state in which sub-device switch circuit 235 closes the circuit.

Figure 12:
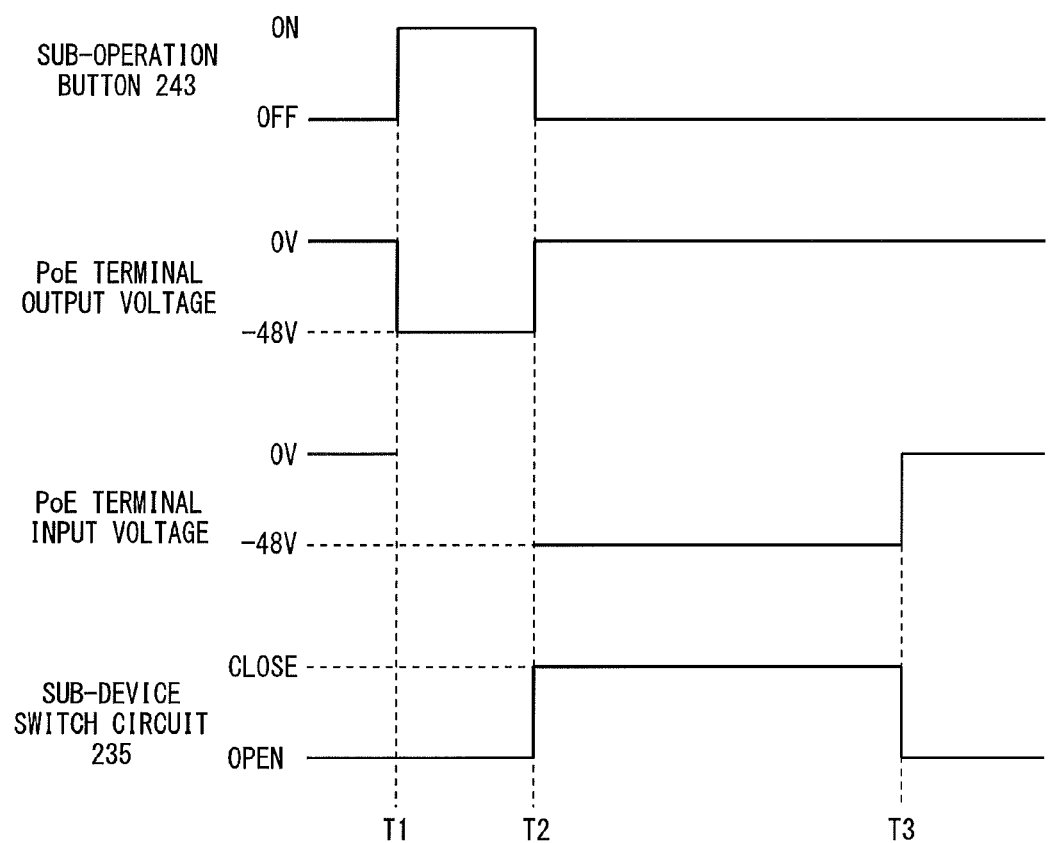
FIG. 12 is a diagram showing an example of a temporal flow of a sub-operation button, input/output voltages of a PoE terminal, and the open/closed state of a sub-device switch circuit.

FIG. 12 is a diagram showing an example of a temporal flow of the sub-operation button, input/output voltages of the PoE terminal, and the open/close state of the sub-device switch circuit. Referring to FIG. 12, the PoE terminal output voltage indicates a voltage applied by sub-CPU 231 to the PoE terminal of the first connector, and the PoE terminal input voltage indicates a voltage of the PoE terminal of the first connector that is detected by sub-CPU 231.

Until time T1, the PoE terminal input voltage is zero, and sub-device switch circuit 235 is opened. At time T1, when the user presses sub-operation button 243, the PoE terminal output voltage changes from 0 V to −48 V that is the PoE voltage. In a period from time T1 to time T2 in which the user is pressing sub-operation button 243, the PoE terminal output voltage reaches −48V, and at time T2 when the user stops pressing sub-operation button 243, the PoE terminal output voltage reaches 0 V.

The PoE input voltage reaches −48 V at time T2, and sub-device switch circuit 235 changes from a circuit-open state to a circuit-closed state. Then, at time T 3 when a predetermined period during which MFP 100A is not executing a process has passed, the PoE input voltage changes from −48 V to 0 V, and sub-device switch circuit 235 changes from a circuit-closed state to a circuit open state. In a period from time T2 to time T3, even if the user presses sub-operation button 243, the PoE terminal output voltage is kept at 0 V and does not change to −48 V because the PoE input voltage is −48 V.

Figure 13:
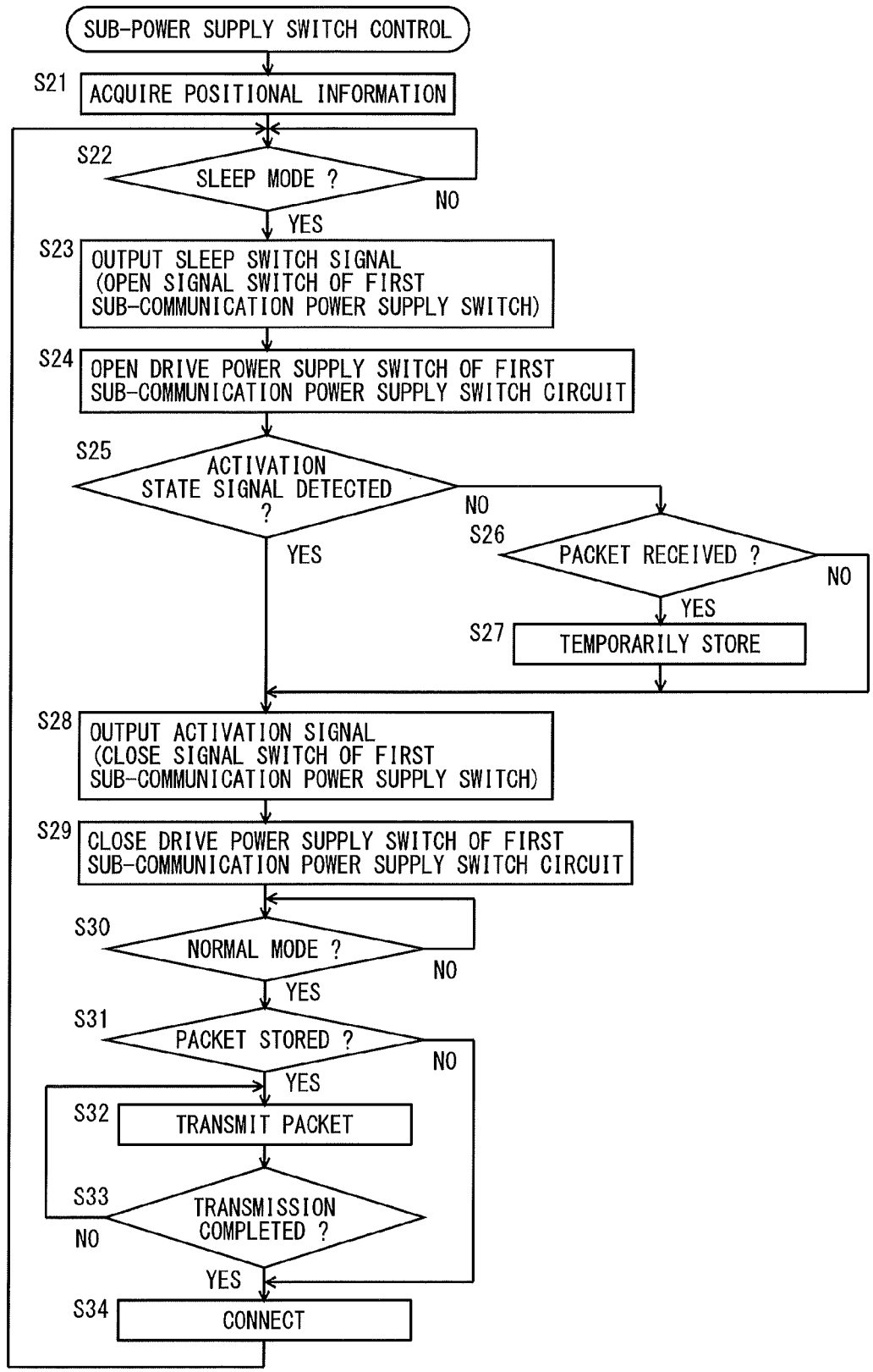
FIG. 13 is a flowchart showing an example of a flow of a sub-power supply control process.

FIG. 13 is a flowchart showing an example of a flow of a sub-power supply control process. The sub-power supply switch control process is executed by CPU 201A when CPU 201A of power supply control device 200A in the second embodiment executes a power supply control program stored in the ROM of CPU 201A. CPU 201A of power supply control device 200A in the second embodiment executes the power supply control process shown in FIG. 6 and executes the sub-power supply control process shown in FIG. 13 for each of MFP 100A and MFP 100B. The sub-power supply control process performed on MFP 100A by CPU 201A and the sub-power supply control process performed on MFP 100B by CPU 201A are the same, and therefore, the sub-power supply control process performed on MFP 100A by CPU 201A will be described here.

Referring to FIG. 13, CPU 201A acquires positional information of MFP 100A (step S21). The positional information is acquired from MFP 100A by communicating with MFP 100A through third communication circuit 221. Alternatively, the user may input the positional information of MFP 100A through remote operation or from the user interface of power supply control device 200.

In the next step S22, it is determined whether the operation mode of MFP 100A is the sleep mode. The operating state is acquired from MFP 100A by communicating with MFP 100A through third communication circuit 221. If a predetermined time has passed without MFP 100A executing a process or without accepting an operation by the user, it is determined that the operation mode is the sleep mode. The process waits until it is determined that the operation mode of MFP 100A is the sleep mode (NO in step S22). If it is determined that the operation mode is the sleep mode (YES in step S22), the process proceeds to step S23.

In step S23, a sleep switch signal is output to MFP 100A. Specifically, the signal switch of first sub-communication power supply switch circuit 225 is opened. As a result, the PoE voltage applied to the PoE terminal of third communication circuit 221 becomes zero. In other words, a sleep switch signal is output to MFP 100A.

In the next step S24, the drive power supply switch of first sub-communication power supply switch circuit 225 is opened. As a result, power supplied from power supply circuit 211 to third communication circuit 221 is cut off, thereby reducing power consumed by third communication circuit 221.

In the next step S25, it is determined whether an activation state signal is detected. Specifically, if the voltage of the PoE terminal of third communication circuit 221 changes to the PoE voltage, an activation state signal is detected. If an activation state signal is detected, the process proceeds to step S28. If not, the process proceeds to step S26.

In step S26, it is determined whether a packet addressed to MFP 100A is received. If a packet in which the positional information acquired in step S21 is set as a destination is received, it is determined that a packet addressed to MFP 100A is received. If a packet addressed to MFP 100A is received, the process proceeds to step S27. If not, the process proceeds to step S28. In step S27, the received packet is temporarily stored, and the process proceeds to step S28. The packet is stored into the RAM of CPU 201A. The packet may be stored into a semiconductor memory such as an EEPROM provided separately from CPU 201A. If a packet addressed to MFP 100A is received even after the process proceeds to step S28, all the received packets are stored into the RAM.

In step S28, an activation signal is output. Specifically, the signal switch of first sub-communication power supply switch circuit 225 is closed. As a result, the PoE voltage is applied to the PoE terminal of third communication circuit 221.

In the next step S29, the drive power supply switch of first sub-communication power supply switch circuit 225 is closed. As a result, power is supplied from power supply circuit 211 to third communication circuit 221, so that communication with MFP 100A becomes ready through third communication circuit 221.

In step S30, it is determined whether the operation mode of MFP 100A is the normal mode. The operating state is acquired from MFP 100A by communicating with MFP 100A through third communication circuit 221. When the operating state is received from MFP 100A, it is determined that the operation mode is the normal mode. The process waits until it is determined that the operation mode of MFP 100A is the normal mode (NO in step S30). If it is determined that the operation mode is the normal mode (YES in step S30), the process proceeds to step S31. All the packets addressed to MFP 100A that are received by first communication circuit 203 are stored into the RAM until it is determined that the operation mode is the normal mode in step S30 after a packet addressed to MFP 100A is received in step S26. This prevents loss of packets addressed to MFP 100A.

In step S31, it is determined whether a packet addressed to MFP 100A is stored in the RAM. If a packet addressed to MFP 100A is stored in the RAM, the process proceeds to step S32. If not, the process proceeds to step S34. In step S32, the packet stored in the RAM is transmitted to MFP 100A through third communication circuit 221. The packet is thus received by MFP 100A. It is determined whether transmission of all the packets stored in the RAM has been completed (step S33). If transmission of packets has not been completed (NO in step S33), the process returns to step S32. If transmission of packets has been completed (YES in step S33), the process proceeds to step S34.

In step S34, first communication circuit 203 is connected with third communication circuit 221. The process then returns to step S22.

Figure 14:
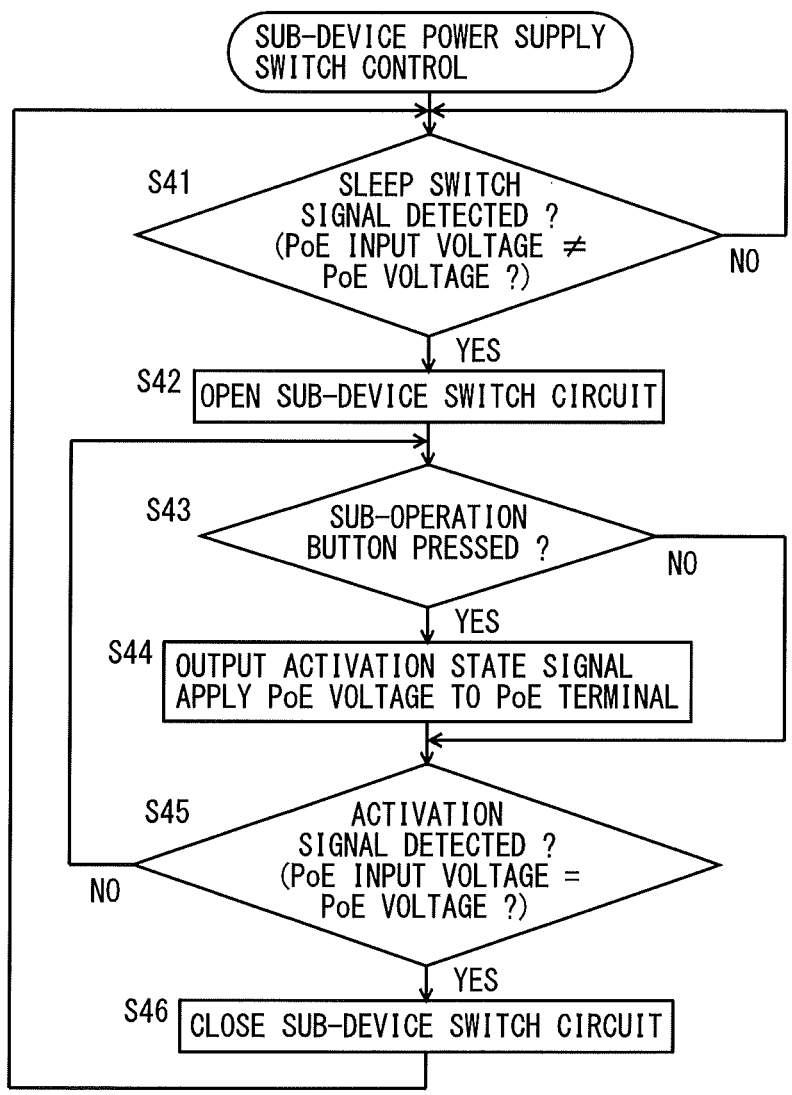
FIG. 14 is a flowchart showing an example of a flow of a sub-device power supply switch control process.

FIG. 14 is a flowchart showing an example of a flow of the sub-device power supply switch control process. The sub-device power supply switch control process is executed by sub-CPU 231 when sub-CPU 231 of each of sub-power supply control devices 230 and 230A in the second embodiment executes a sub-device power supply switch control program stored in the ROM of CPU 231. The processes executed by respective sub-CPUs 231 of sub-power supply control devices 230 and 230A are the same, and therefore, a process executed by sub-CPU 231 of sub-power supply control device 230 will be described here.

Referring to FIG. 14, sub-CPU 231 determines whether a sleep switch signal output from power supply control device 200A is detected (step S41). The process waits until a sleep switch signal is detected (NO in step S41). If a sleep switch signal is detected (YES in step S41), the process proceeds to step S42. A sleep switch signal is detected if the PoE terminal of first connector 233 changes from the PoE voltage to zero.

In step S42, sub-device switch circuit 235 is opened. As a result, sub-power plug 241 is not electrically connected with sub-power output terminal 239, so that power is not supplied to MFP 100A from the commercial power supply, thereby reducing power consumed by MFP 100A.

In step S43, it is determined whether sub-operation button 243 is pressed. If sub-operation button 243 is pressed, the process proceeds to step S44. If not, step S44 is skipped, and the process proceeds to step S45. In step S44, an activation state signal is output. Specifically, the PoE voltage is applied to the PoE terminal of first connector 233. As a result, an activation state signal is detected in power supply control device 200A.

In step S45, it is determined whether an activation signal is detected. If an activation signal is detected, the process proceeds to step S46. If not, the process returns to step S43. An activation signal is detected if the PoE terminal of first connector 233 changes from zero to the PoE voltage.

In step S46, sub-device switch circuit 235 is closed, and the process returns to step S41. As a result, sub-power plug 241 becomes electrically connected with sub-power output terminal 239, so that power is supplied from the commercial power supply to MFP 100A, thereby activating MFP 100A.

Power supply control device 200A in the second embodiment further includes, in addition to the functions of power supply control device 200 in the first embodiment, third communication circuit 211 connected to MFP 100A and signal output control portion 267 outputting an activation signal or a sleep transition signal to sub-power supply control device 230. Sub-power supply control device 230 includes sub-power supply circuit 237 for converting AC current supplied from the commercial power supply to DC power, sub-CPU 231 supplied with power from sub-power supply circuit 237, and sub-device switch circuit 235 arranged between the commercial power supply and MFP 100A. Mode decision portion 251A of CPU 201A of power supply control device 200A includes remote mode decision portion 271 that acquires a state of MFP 100A by communicating with MFP 100A through third communication circuit 211 and decides between the normal mode and the power-saving mode in which power consumption is smaller than in the normal mode. Sleep switch portion 253A includes remote sleep switch portion 273 that allows signal output control portion 267 to output a sleep transition signal if the sleep mode is decided as the state of MFP 100A by remote mode decision portion 271. Activation portion 255A includes remote activation portion 275 that allows signal output control portion 267 to output an activation signal in response to detection of reception of a packet including the network address of MFP 100A by first communication circuit 203 from LAN 2. Temporary storage control portion 261A includes remote temporary storage control portion 277 that temporarily stores a packet including the network address of MFP 100A, among packets received by first communication circuit 203 from LAN 2, after the sleep mode is decided as the state of MFP 100A by remote mode decision portion 271. Packet transmission portion 263 includes remote packet transmission portion 279 that transmits the packet temporarily stored by remote temporary storage control portion 277 to MFP 100A through third communication circuit 211 in response to the normal mode being decided as the state of MFP 100A by remote mode decision portion 271. Connection portion 265A includes remote connection portion 281 that connects LAN 2 connected to first communication circuit 203 to third communication circuit 221 after transmission by remote packet transmission portion 279 is finished. Sub-CPU 231 includes power supply switch control portion 291 that opens sub-device switch circuit 235 in response to detection of a sleep transition signal output from power supply control device 200A and closes sub-device switch circuit 235 in response to detection of an activation signal output from power supply control device 200A.

Therefore, power consumption of MFP 100A can be reduced. After the sleep mode is decided as the operation mode of MFP 100A, an activation signal is output to sub-power supply control device 230 in response to a packet including the network address of MFP 100A being received from LAN 2. Sub-power supply control device 230 closes sub-device switch circuit 235 in response to the activation signal being detected, thereby activating MFP 100A. After the sleep mode is decided as the operation mode of MFP 100A, among packets received from LAN 2, a packet including the network address of MFP 100A is temporarily stored. The temporarily stored packet is transmitted in response to the normal mode being decided. After transmission is finished, LAN 2 is connected to third communication circuit 221. This ensures that the packet transmitted to MFP 100A is received by MFP 100A. As a result, power consumption of MFP 100A can be reduced, while MFP 100A can receive a packet reliably.

Power supply control device 200A further includes first sub-communication power supply switch circuit 225 provided between third communication circuit 221 and power supply circuit 211. Remote mode decision portion 271 acquires a state of MFP 100A by communicating with MFP 100A through third communication circuit 221 while first sub-communication power supply switch circuit 225 is closed. Remote sleep switch portion 273 allows signal output control portion 267 to output a sleep transition signal and opens first sub-communication power supply switch circuit 225 when the sleep mode is decided as the state of MFP 100A by remote mode decision portion 271. Remote activation portion 275 allows signal output control portion 267 to output an activation signal and closes first sub-communication power supply switch circuit 225 in response to a packet including the network address of MFP 100A being received by first communication circuit 203 from LAN 2, after the sleep mode is decided as the state of MFP 100A by remote mode decision portion 271. Accordingly, power consumed for communication with MFP 100A can be reduced.

Sub-power supply control device 230 further includes sub-voltage detection portion 299 that detects a voltage of the PoE terminal of third communication circuit 221. Signal output control portion 267 outputs an activation signal by changing the voltage applied to the PoE terminal of third communication circuit 221 to the PoE voltage (−48 V) and outputs a sleep transition signal by changing the voltage applied to the PoE terminal of third communication circuit 221 from the PoE voltage (−48 V) to a voltage (0 V) different from the PoE voltage. The sub-CPU 231 includes activation signal detection portion 295 that detects an activation signal in response to the voltage detected by sub-voltage detection portion 299 changing to the PoE voltage (−48 V), and sleep transition signal detection portion 293 that detects a sleep transition signal in response to the voltage detected by sub-voltage detection portion 299 changing from the PoE voltage (−48 V) to a voltage (0 V) different from the PoE voltage.

Accordingly, a signal can be transmitted/received between power supply control device 200A and sub-power supply control device 230 using a communication cable that connects power supply control device 200A with MFP 100A, so that the wiring for connecting the power supply control device and the sub-power supply control device can be reduced.

Power supply control device 200A further includes activation state signal detection portion 269 that detects an activation state signal output from sub-power supply control device 230. Sub-power supply control device 230 further includes sub-operation switch 243 that accepts an operation by the user. Sub-CPU 231 outputs an activation state signal to power supply control device 200A and closes first sub-communication power supply switch circuit 225, in response to sub-operation switch 243 being pressed by the user. Remote connection portion 281 connects LAN 2 connected to first communication circuit 203 to third communication circuit 221 in response to an activation state signal being detected by activation state signal detection portion 269, after the sleep mode is decided as the state of MFP 100A by remote mode decision portion 271.

Thus, when the operation by the user is accepted, sub-power supply control device 230 outputs an activation state signal to power supply control device 200A and closes first sub-communication power supply switch circuit 225, thereby activating MFP 100A. When an activation state signal output from sub-power supply control device 230 is detected, power supply control device 200A connects LAN 2 to MFP 100A. Therefore, the user's operation input to sub-power supply control device 230 makes MFP 100A ready for communication.

Power supply control device 200A further includes voltage sensor 223 provided between third communication circuit 221 and first sub-communication power supply switch circuit 225 for detecting a voltage of the PoE terminal of third communication circuit 221. In-operation activation portion 297 outputs an activation state signal by changing the voltage applied to the PoE terminal of third communication circuit 221 to the PoE voltage (−48 V). Activation state signal detection portion 269 detects an activation state signal in response to the voltage detected by voltage sensor 223 changing to the PoE voltage (−48 V).

Therefore, in sub-power supply control device 230, an activation state signal is output by changing the voltage of the PoE terminal connected to MFP 100A. In power supply control device 200A, an activation state signal is detected by detecting a change of the voltage of the PoE terminal connected to MFP 100A. Accordingly, a signal can be transmitted/received between power supply control device 200A and sub-power supply control device 230 using the communication cable that connects power supply control device 200A with MFP 100A, so that the wiring for connecting power supply control device 200A and sub-power supply control device 230 can be reduced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A power supply control device arranged between a commercial power supply and an image forming apparatus, comprising:
   a power conversion portion to convert power supplied from the commercial power supply from alternating current to direct current;
   a control portion supplied with power from the power conversion portion;
   a first communication portion supplied with power from the power conversion portion and connected to a network;
   a second communication portion connected to the image forming apparatus; and
   a device power supply switch arranged between the commercial power supply and the image forming apparatus,
   the control portion including
   a mode decision portion to acquire a state of the image forming apparatus by communicating with the image forming apparatus through the second communication portion and to decide between a normal mode and a power-saving mode in which power consumption is smaller than in the normal mode,
   a positional information acquisition portion to acquire positional information allocated beforehand to the image forming apparatus to indicate a position on the network,
   a sleep switch portion to open the device power supply switch when the sleep mode is decided by the mode decision portion,
   an activation portion to close the device power supply switch in response to a packet including the positional information of the image forming apparatus being received by the first communication portion from the network, after the sleep mode is decided by the mode decision portion,
   a temporary storage control portion to temporarily store a packet including the positional information of the image forming apparatus, among packets received by the first communication portion from the network, after the sleep mode is decided by the mode decision portion,
   a packet transmission portion to transmit the temporarily stored packet through the second communication portion in response to the normal mode being decided by the mode decision portion, and
   a connection portion to connect the network connected to the first communication portion to the second communication portion after transmission by the packet transmission portion is finished.

2. The power supply control device according to claim 1, further comprising a communication power supply switch provided between the second communication portion and the power conversion portion, wherein
   the mode decision portion communicates with the image forming apparatus through the second communication portion while the communication power supply switch is closed,
   the sleep switch portion opens the communication power supply switch in addition to the device power supply switch when the sleep mode is decided by the mode decision portion, and
   the activation portion closes the communication power supply switch in addition to the device power supply switch in response to a packet including the positional information of the image forming apparatus being received by the first communication portion from the network, after the sleep mode is decided by the mode decision portion.

3. The power supply control device according to claim 2, further comprising an operation switch to accept an operation by a user, wherein
   the activation portion closes the device power supply switch and the communication power supply switch in response to the operation switch being operated, and
   the connection portion connects the network connected to the first communication portion to the second communication portion in response to the operation switch being operated.

4. A power supply control system including the power supply control device of claim 1 and a sub-power supply control device,
   the power supply control device further comprising:
   a third communication portion connected to another image forming apparatus different from the image forming apparatus; and
   a signal output control portion to output an activation signal or a sleep transition signal to the sub-power supply control device,
   the sub-power supply control device comprising:
   a sub-power conversion portion to convert power supplied from a commercial power supply from alternating current to direct current;
   a sub-control portion supplied with power from the sub-power conversion portion; and
   a sub-device power supply switch arranged between the commercial power supply and another image forming apparatus,
   the mode decision portion of the control portion including a remote mode decision portion to acquire a state of another image forming apparatus by communicating with another image forming apparatus through the third communication portion and to decide between a normal mode and a power-saving mode in which power consumption is smaller than in the normal mode,
   the sleep switch portion including a remote sleep switch portion to allow the signal output control portion to output the sleep transition signal when the sleep mode is decided as a state of another image forming apparatus by the remote mode decision portion,
   the activation portion including a remote activation portion to allow the signal output control portion to output the activation signal in response to detection of reception of a packet including positional information of another image forming apparatus by the first communication portion from the network, after the sleep mode is decided as a state of another image forming apparatus by the remote mode decision portion,
   the temporary storage control portion including a remote temporary storage control portion to temporarily store a packet including positional information of another image forming apparatus, among packets received by the first communication portion from the network, after the sleep mode is decided as a state of another image forming apparatus by the remote mode decision portion,
   the packet transmission portion including a remote packet transmission portion to transmit the packet temporarily stored by the remote temporary storage control portion to another image forming apparatus through the third communication portion, in response to the normal mode being decided as a state of another image forming apparatus by the remote mode decision portion, the connection portion including a remote connection portion to connect the network connected to the first communication portion to the third communication portion, after transmission by the remote packet transmission portion is finished, the sub-control portion including a power supply switch control portion to open the sub-device power supply switch in response to detection of a sleep transition signal output from the power supply control device and to close the sub-device power supply switch in response to detection of an activation signal output from the power supply control device.

5. The power supply control system according to claim 4, wherein the power supply control device further comprises a sub-communication power supply switch provided between the third communication portion and the power conversion portion, the remote mode decision portion acquires a state of another image forming apparatus by communicating with another image forming apparatus through the third communication portion while the sub-communication power supply switch is closed, the remote sleep switch portion allows the signal output control portion to output the sleep transition signal and opens the sub-communication power supply switch when the sleep mode is decided as a state of another image forming apparatus by the remote mode decision portion, and the remote activation portion allows the signal output control portion to output the activation signal and closes the sub-communication power supply switch in response to detection of reception of a packet including positional information of another image forming apparatus by the first communication portion from the network, after the sleep mode is decided as a state of another image forming apparatus by the remote mode decision portion.

6. The power supply control system according to claim 5, wherein the sub-power supply control device further comprises a sub-voltage detection portion to detect a voltage of a predetermined terminal of the third communication portion, the signal output control portion outputs the activation signal by changing a voltage applied to the predetermined terminal of the third communication portion from a first voltage to a second voltage and outputs the sleep transition signal by changing a voltage applied to the predetermined terminal of the third communication portion from the second voltage to the first voltage, and the sub-control portion includes an activation signal detection portion to detect the activation signal in response to a voltage detected by the sub-voltage detection portion changing from the first voltage to the second voltage, and a sleep transition signal detection portion to detect the sleep transition signal in response to a voltage detected by the sub-voltage detection portion changing from the second voltage to the first voltage.

7. The power supply control system according to claim 6, wherein the power supply control device further comprises an activation state signal detection portion to detect an activation state signal output from the sub-power supply control device, the sub-power supply control device further comprises a sub-operation switch to accept an operation by a user, the sub-control portion includes an in-operation activation portion to output an activation state signal to the power supply control device and close the sub-device power supply switch, in response to the sub-operation switch being operated, and the remote connection portion connects the network connected to the first communication portion to the third communication portion, in response to the activation state signal being detected by the activation state signal detection portion, after the sleep mode is decided as a state of another image forming apparatus by the remote mode decision portion.

8. The power supply control system according to claim 7, wherein the power supply control device further comprises a voltage detection portion provided between the third communication portion and the sub-communication power supply switch to detect a voltage of the predetermined terminal of the third communication portion, the in-operation activation portion outputs the activation state signal by changing a voltage applied to the predetermined terminal of the third communication portion from a first voltage to a second voltage, and the activation state signal detection portion detects the activation state signal in response to a voltage detected by the voltage detection portion changing from the second voltage to the first voltage.

9. A power supply control method performed in a power supply control device arranged between a commercial power supply and an image forming apparatus, the power supply control device including a power conversion portion to convert power supplied from the commercial power supply from alternating current to direct current, a control portion supplied with power from the power conversion portion, a first communication portion supplied with power from the power conversion portion and connected to a network, a second communication portion connected to the image forming apparatus, and a device power supply switch arranged between the commercial power supply and the image forming apparatus, the power supply control method comprising:

a mode decision step of acquiring a state of the image forming apparatus by communicating with the image forming apparatus through the second communication portion, and deciding between a normal mode and a power-saving mode in which power consumption is smaller than in the normal mode;

a positional information acquisition step of acquiring positional information allocated beforehand to the image forming apparatus to indicate a position on the network;

a sleep switch step of opening the device power supply switch when the sleep mode is decided in the mode decision step;

an activation step of closing the device power supply switch in response to a packet including the positional information of the image forming apparatus being received by the first communication portion from the network, after the sleep mode is decided in the mode decision step;
a temporary storage control step of temporarily storing a packet including the positional information of the image forming apparatus, among packets received by the first communication portion from the network, after the sleep mode is decided in the mode decision step;
a packet transmission step of transmitting the temporarily stored packet through the second communication portion in response to the normal mode being decided in the mode decision step; and
a connection step of connecting the network connected to the first communication portion to the second communication portion after transmission is finished in the packet transmission step.

10. The power supply control method according to claim 9, wherein
the power supply control device further includes a communication power supply switch provided between the second communication portion and the power conversion portion,
the mode decision step includes a step of communicating with the image forming apparatus through the second communication portion while the communication power supply switch is closed,
the sleep switch step includes a step of opening the communication power supply switch in addition to the device power supply switch when the sleep mode is decided in the mode decision step, and
the activation step includes a step of closing the communication power supply switch in addition to the device power supply switch in response to a packet including the positional information of the image forming apparatus being received by the first communication portion from the network, after the sleep mode is decided in the mode decision step.

11. The power supply control method according to claim 10, wherein
the power supply control device further includes an operation switch to accept an operation by a user,
the activation step includes a step of closing the device power supply switch and the communication power supply switch in response to the operation switch being operated, and
the connection step includes a step of connecting the network connected to the first communication portion to the second communication portion in response to the operation switch being operated.

12. A non-transitory computer-readable recording medium encoded with a power supply control program performed by a control portion which controls a power supply control device arranged between a commercial power supply and an image forming apparatus,
the power supply control device including
a power conversion portion to convert power supplied from the commercial power supply from alternating current to direct current,
a first communication portion supplied with power from the power conversion portion and connected to a network,
a second communication portion connected to the image forming apparatus, and
a device power supply switch arranged between the commercial power supply and the image forming apparatus,
the control portion being supplied with power from the power conversion portion,
the power supply control program causing the control portion to execute:
a mode decision step of acquiring a state of the image forming apparatus by communicating with the image forming apparatus through the second communication portion, and deciding between a normal mode and a power-saving mode in which power consumption is smaller than in the normal mode;
a positional information acquisition step of acquiring positional information allocated beforehand to the image forming apparatus to indicate a position on the network;
a sleep switch step of opening the device power supply switch when the sleep mode is decided in the mode decision step;
an activation step of closing the device power supply switch in response to a packet including the positional information of the image forming apparatus being received by the first communication portion from the network, after the sleep mode is decided in the mode decision step;
a temporary storage control step of temporarily storing a packet including the positional information of the image forming apparatus, among packets received by the first communication portion from the network, after the sleep mode is decided in the mode decision step;
a packet transmission step of transmitting the temporarily stored packet through the second communication portion in response to the normal mode being decided in the mode decision step; and
a connection step of connecting the network connected to the first communication portion to the second communication portion after transmission is finished in the packet transmission step.

13. The non-transitory computer-readable recording medium according to claim 12, wherein
the power supply control device further includes a communication power supply switch provided between the second communication portion and the power conversion portion,
the mode decision step includes a step of communicating with the image forming apparatus through the second communication portion while the communication power supply switch is closed,
the sleep switch step includes a step of opening the communication power supply switch in addition to the device power supply switch when the sleep mode is decided in the mode decision step, and
the activation step includes a step of closing the communication power supply switch in addition to the device power supply switch in response to a packet including the positional information of the image forming apparatus being received by the first communication portion from the network, after the sleep mode is decided in the mode decision step.

14. The non-transitory computer-readable recording medium according to claim 13, wherein
the power supply control device further includes an operation switch to accept an operation by a user,
the activation step includes a step of closing the device power supply switch and the communication power supply switch in response to the operation switch being operated, and
the connection step includes a step of connecting the network connected to the first communication portion to the second communication portion in response to the operation switch being operated.

* * * * *